United States Patent
Chino et al.

(10) Patent No.: US 7,250,079 B2
(45) Date of Patent: *Jul. 31, 2007

(54) COLORING COMPOSITION AND INKJET RECORDING METHOD

(75) Inventors: Tomohiro Chino, Kanagawa (JP); Toshiki Fujiwara, Kanagawa (JP); Masaru Takasaki, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 229 days.

This patent is subject to a terminal disclaimer.

(21) Appl. No.: 10/752,001

(22) Filed: Jan. 7, 2004

(65) Prior Publication Data

US 2004/0187232 A1   Sep. 30, 2004

(30) Foreign Application Priority Data

Jan. 8, 2003  (JP) .................... P. 2003-002408
Oct. 21, 2003 (JP) .................... P. 2003-360370
Dec. 26, 2003 (JP) .................... P. 2003-432210

(51) Int. Cl.
  *C09D 11/00* (2006.01)
  *C09D 11/02* (2006.01)
  *C09B 67/00* (2006.01)

(52) U.S. Cl. .................... 106/31.52; 106/31.51; 106/31.46; 106/31.48; 106/31.5; 106/31.49; 8/639; 8/641

(58) Field of Classification Search ............. 106/31.52, 106/31.51, 31.46, 31.48, 31.5, 31.49; 8/639, 8/641

See application file for complete search history.

(56) References Cited

U.S. PATENT DOCUMENTS

| | | | |
|---|---|---|---|
| 5,439,517 A * | 8/1995 | Yoshida et al. ........... | 106/31.48 |
| 5,948,154 A * | 9/1999 | Hayashi et al. ........... | 106/31.48 |
| 6,267,806 B1 | 7/2001 | Lavery et al. | |
| 6,939,399 B2 * | 9/2005 | Yabuki ..................... | 106/31.27 |
| 7,014,308 B2 * | 3/2006 | Wachi ....................... | 347/100 |
| 7,029,523 B2 * | 4/2006 | Taguchi et al. ........... | 106/31.46 |
| 2002/0107301 A1 | 8/2002 | Yamanouchi et al. | |
| 2003/0217671 A1 * | 11/2003 | Ozawa .................... | 106/31.49 |
| 2004/0050291 A1 * | 3/2004 | Taguchi et al. .......... | 106/31.27 |
| 2004/0070654 A1 * | 4/2004 | Taguchi et al. ............ | 347/100 |
| 2004/0154496 A1 * | 8/2004 | Taguchi .................... | 106/31.48 |

FOREIGN PATENT DOCUMENTS

| | | |
|---|---|---|
| EP | 0253933 A1 | 1/1988 |
| EP | 0681008 A2 | 11/1995 |
| EP | 0 761 771 B1 | 11/1998 |
| EP | 1013720 A2 | 6/2000 |
| EP | 1340796 A1 | 9/2003 |
| EP | 1350819 A1 | 10/2003 |
| EP | 1350820 A1 | 10/2003 |
| EP | 1391487 A2 | 2/2004 |
| EP | 1391488 A1 | 2/2004 |
| EP | 1403338 A1 | 3/2004 |
| EP | 1403339 A1 | 3/2004 |
| JP | 2716541 | 11/1997 |
| JP | 10-217597 A | 8/1998 |
| WO | WO 00/63298 A1 | 10/2000 |
| WO | WO 01/00736 A2 | 1/2001 |
| WO | WO 02/098988 A2 | 12/2002 |
| WO | WO 03/068867 A1 | 8/2003 |
| WO | WO 03/080739 A1 | 10/2003 |
| WO | WO 03/080741 A1 | 10/2003 |
| WO | WO 03/087237 A1 | 10/2003 |
| WO | WO 03/106568 A1 | 12/2003 |

OTHER PUBLICATIONS

Database WPI, Section Ch, Week 199843, Derwent Publications Ltd.,, London, GB; AN 1998-500557, XP002276942, JP 10 217597, Aug. 1998.
EPO Search Report dated Apr. 27, 2004 in EP Application No. 04000276.8-1221.

* cited by examiner

*Primary Examiner*—Helene Klemanski
(74) *Attorney, Agent, or Firm*—Buchanan Ingersoll & Rooney PC

(57) ABSTRACT

The invention provides a water-soluble ink capable of forming an image having good color hue and high fastness in various use and environmental conditions, which comprises a coloring composition comprising a disazo dye represented by the following formula 1: $A_1\text{-}N{=}N\text{-}A_2\text{-}N{=}N\text{-}A_3$ and at least one other dye having a specific structure; in formula 1, $A_1$, $A_2$ and $A_3$ each independently represents an aromatic group which may be substituted or a heterocyclic group which may be substituted, and $A_1$ and $A_3$ each is a monovalent group and $A_2$ is a divalent group.

16 Claims, No Drawings

COLORING COMPOSITION AND INKJET RECORDING METHOD

FIELD OF THE INVENTION

The present invention relates to a coloring composition (preferably a coloring composition (an ink composition, preferably an inkjet ink composition) for forming a color image) containing a combination of an azo dye mainly using a heterocyclic ring as the raw material with an azo dye or the like having a specific structure, and at least a solvent. The present invention also relates to an inkjet recording method using the coloring composition (preferably, black coloring composition).

BACKGROUND OF THE INVENTION

The inkjet recording method is abruptly overspread and still making a progress, because the material cost is low, high-speed recording can be performed, noises are less generated at the recording and color recording is facilitated.

The inkjet recording method includes a continuous system of continuously jetting out a liquid droplet and an on-demand system of jetting out a liquid droplet according to image information signals, and the ejection system therefor includes a system of jetting out a liquid droplet by applying a pressure using a piezoelectric element, a system of jetting out a liquid droplet by generating bubbles in an ink under heat, a system using an ultrasonic wave, and a system of jetting out a liquid droplet by suction using an electrostatic force. With respect to the inkjet recording ink, an aqueous ink, an oily ink or a solid (fusion-type) ink is used.

The coloring agent used in such an inkjet recording ink is required to exhibit good solubility or dispersibility in a solvent, enable high-density recording, provide good color, be fast to light, heat and active gases in the environment (for example, oxidative gas (e.g., NOx, ozone) and SOx) and highly resistant against water and chemicals, ensure good fixing property and less blurring on an image-receiving material, give an ink having excellent storability, have high purity and no toxicity and be available at a low cost. However, it is very difficult to find out a coloring agent satisfying these requirements in a high level. In particular, a dye having good color hue and being fast to light, humidity and heat, especially at the printing on an image-receiving material having an ink-accepting layer containing a porous inorganic white pigment particle, being fast to oxidative gases in the environment, such as ozone, is strongly demanded.

As the dye for black color, a mixture of a disazo or trisazo dye with a yellow or magenta dye has been heretofore developed and for the raw material of these disazo and trisazo dyes, non-heterocyclic compounds such as phenol, naphthol, naphthylamine and aniline are being widely used. As for the disazo dye obtained from such raw materials, the dyes disclosed, for example, in European Patent No. 0761771 and Japanese Patent No. 2716541 are known, however, these dyes all are poor in the light fastness and furthermore, the fastness to oxidative gases such as ozone is extremely insufficient. Therefore, if such a dye is mixed with a yellow or magenta dye, the problem of poor light fastness or very insufficient fastness to oxidative gases such as ozone remains unsolved.

SUMMARY OF THE INVENTION

The present invention has been made to solve those problems in conventional techniques and achieve the following objects.

That is, an object of the present invention is to provide an ink composition for printing such as inkjet printing or an aqueous ink composition for writing, which gives a color image or colored material having good black color hue and excellent fastness.

Another object of the present invention is to provide an ink composition for inkjet recording and an inkjet recording method, which can form an image having good black color hue and high fastness to light and active gases in the environment, particularly ozone gas.

As a result of extensive investigations on various dye compound derivatives to obtain a dye ensuring good color hue and high fastness to light and ozone, the present inventors have found that the above-described objects of the present invention can be attained by mixing an azo dye mainly using a heterocyclic ring as the raw material with an azo dye having a specific structure and/or a metal phthalocyanine dye.

1. A coloring composition comprising a dye represented by the following formula 1 and at least one dye selected from the dyes represented by the following formulae 2 to 6:

Formula 1:

Formula 2:

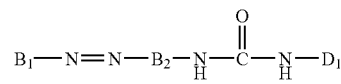

Formula 3:

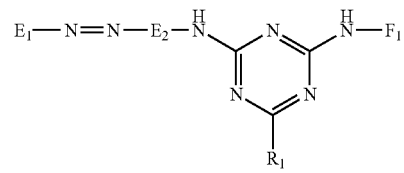

Formula 4:

Formula 5:

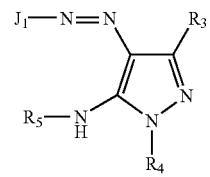

Formula 6:

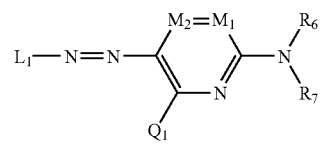

wherein in formula 1, $A_1$, $A_2$ and $A_3$ each independently represents an aromatic group which may be substituted, or a heterocyclic group which may be substituted, and $A_1$ and $A_3$ each is a monovalent group and $A_2$ is a divalent group;

in formula 2, $B_1$ and $B_2$ each independently represents an aromatic group which may be substituted, or a heterocyclic group which may be substituted, and $D_1$ represents an arbitrary substituent;

in formula 3, $E_1$ and $E_2$ each independently represents an aromatic group which may be substituted or a heterocyclic group which may be substituted, $E_1$ is a monovalent group and $E_2$ is a divalent group, $F_1$ represents an arbitrary substituent, and $R_1$ represents a monovalent group;

in formula 4, $G_1$ and $G_2$ each independently represents an aromatic group which may be substituted, or a heterocyclic group which may be substituted, and $R_2$ represents an arbitrary substituent except for hydrogen;

in formula 5, $R_3$ and $R_5$ each independently represents a hydrogen atom, an alkyl group, a cycloalkyl group, an aralkyl group, an alkoxy group or an aryl group, $R_4$ represents a hydrogen atom, an alkyl group, a cycloalkyl group, an aralkyl group, a carbamoyl group, an acyl group, an aryl group or a heterocyclic group, and $J_1$ represents an aromatic group which may be substituted, or a heterocyclic group which may be substituted; and in formula 6, $L_1$ represents an aromatic group which may be substituted, or a heterocyclic group which may be substituted; $M_1$ and $M_2$ each represents $=CR_8-$ or $-CR_9=$, or either one of $M_1$ and $M_2$ represents a nitrogen atom and the other represents $=CR_8-$ or $-CR_9=$; $R_6$ and $R_7$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; $Q_1$, $R_8$ and $R_9$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an arylsulfinyl group, a heterocyclic sulfinyl group, a sulfamoyl group, a sulfo group or a heterocyclic thio group, and each group may be further substituted; and $R_8$ and $R_6$, or $R_6$ and $R_7$ may combine to form a 5- or 6-membered ring.

2. The coloring composition as described in the item 1, wherein $A_3$ in formula 1 represents an aromatic heterocyclic group.

3. The coloring composition as described in the item 1 or 2, wherein at least one of $A_1$ and $A_2$ in formula 1 represents an aromatic heterocyclic group.

4. The coloring composition as described in any one of the items 1 to 3, wherein $A_3$ in formula 1 represents an aromatic nitrogen-containing 6-membered heterocyclic group.

5. The coloring composition as described in any one of the items 1 to 4, wherein the dye represented by formula 1 is a dye represented by the following formula 7:

Formula 7:

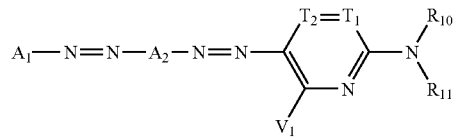

wherein $T_1$ and $T_2$ each represents $=CR_{12}-$ or $-CR_{13}=$, or either one of $T_1$ and $T_2$ represents a nitrogen atom and the other represents $=CR_{12}-$ or $-CR_{13}=$; $V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted; $R_{10}$ and $R_{11}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_{10}$ and $R_{11}$ do not represent a hydrogen atom at the same time; and $R_{12}$ and $R_{10}$, or $R_{10}$ and $R_{11}$ may combine to form a 5- or 6-membered ring.

6. The coloring composition as described in the item 5, wherein the dye represented by formula 7 is a dye represented by the following formula 8 or formula 8-2:

Formula 8:

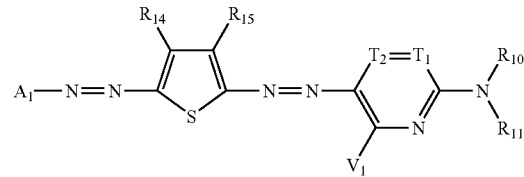

Formula 8-2:

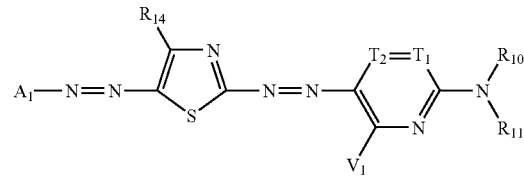

wherein $R_{14}$ and $R_{15}$ each has the same meaning as $R_{12}$ of formula 7 and $A_1$, $R_{10}$, $R_{11}$, $T_1$, $T_2$ and $V_1$ have the same meanings as in formula 7.

7. The coloring composition as described in any one of the items 1 to 6, wherein the dye represented by formula 2 is a dye represented by the following formula 9:

Formula 9:

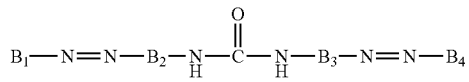

wherein $B_1$, $B_2$, $B_3$ and $B_4$ each independently represents an aromatic group which may be substituted, or a heterocyclic group which may be substituted.

8. The coloring composition as described in any one of the items 1 to 7, wherein the dye represented by formula 3 is a dye represented by the following formula 10:

Formula 10:

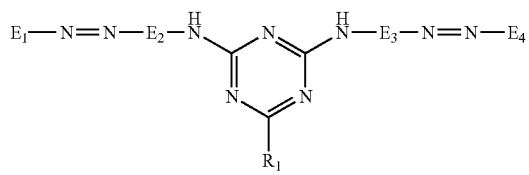

wherein $E_1$, $E_2$, $E_3$ and $E_4$ each independently represents an aromatic group which may be substituted, or a heterocyclic group which may be substituted, and $R_1$ represents a monovalent substituent.

9. The coloring composition as described in any one of the items 1 to 8, wherein the dye represented by formula 6 is a dye represented by the following formula 11:

Formula 11:

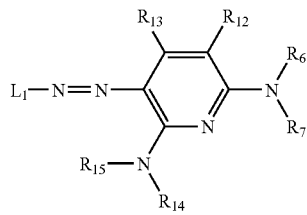

wherein $L_1$, $R_6$ and $R_7$ have the same meanings as in formula 6, $R_{12}$ and $R_{13}$ have the same meanings as $R_8$ and $R_9$, respectively, $R_{14}$ and $R_{15}$ each independently represents a hydrogen atom, an aliphatic group, an aromatic group, a heterocyclic group, an acyl group, an alkoxycarbonyl group, an aryloxycarbonyl group, a carbamoyl group, a sulfonyl group or a sulfamoyl group.

10. The coloring composition as described in any one of the items 1 to 9, which further comprises a metal phthalocyanine dye.

11. The coloring composition as described in the item 10, wherein the metal phthalocyanine dye is a dye represented by the following formula 12:

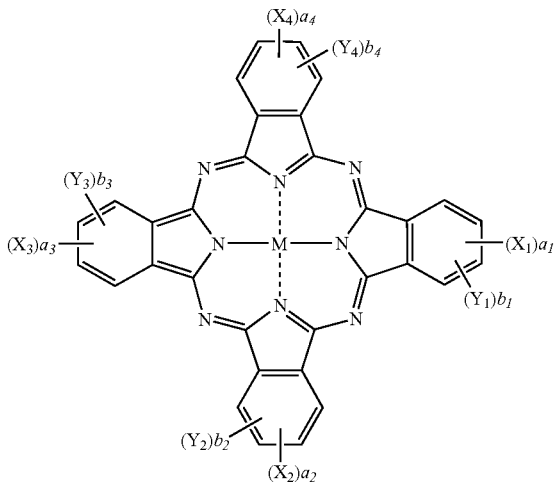

wherein $X_1$, $X_2$, $X_3$ and $X_4$ each independently represents a group selected from the group consisting of —SO-Z, —SO$_2$-Z, —SO$_2$NR$_{18}$R$_{19}$ and a sulfo group, Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, and $R_{18}$ and $R_{19}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, provided that $R_{18}$ and $R_{19}$ do not represent a hydrogen atom at the same time;

$a_1$ to $a_4$ and $b_1$ to $b_4$ represent the number of substituents $X_1$ to $X_4$ and $Y_1$ to $Y_4$, respectively, and each independently represents an integer of 0 to 4, provided that the sum total of $a_1$ to $a_4$ is 2 or more; and $Y_1$, $Y_2$, $Y_3$ and $Y_4$ each independently represents a hydrogen atom or a monovalent substituent.

12. The coloring composition as described in the item 11, wherein the dye represented by formula 12 is a dye represented by the following formula 13:

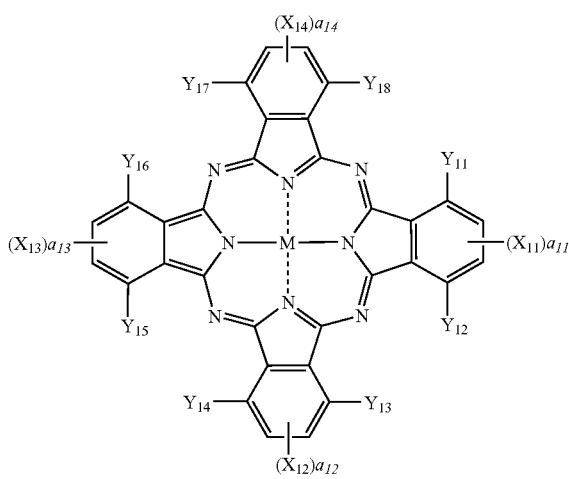

wherein $X_{11}$ to $X_{14}$ and $Y_{11}$ to $Y_{18}$ have the same meanings as $X_1$ to $X_4$ and $Y_1$ to $Y_4$ in formula 12, respectively, and $a_{11}$ to $a_{14}$ each independently represents an integer of 1 or 2.

13. An aqueous ink comprising the coloring composition described in any one of the items 1 to 12.

14 An inkjet recording ink comprising the aqueous ink described in claim 13.

15 An inkjet recording method comprising forming an image on an image-receiving material by using the inkjet recording ink described in claim 14, the image-receiving material comprising a support and an ink-accepting layer containing an inorganic white pigment particle.

DETAILED DESCRIPTION OF THE INVENTION

The present invention is described in detail below.

The azo dyes for use in the present invention, represented by formula 1 and subordinate concept formulae 7 and 8, the azo dyes represented by formula 2 and subordinate concept formula 9, the azo dyes represented by formula 3 and subordinate concept formula 10, the azo dyes represented by formula 6 and subordinate concept formula 11, and the copper phthalocyanine dyes represented by formula 12 and subordinate concept formula 13 are described in detail below.

The groups and substituents constituting these formulae are described below.

The halogen atom includes a fluorine atom, a chlorine atom and a bromine atom.

In the present invention, the aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

In the present invention, the monovalent aromatic group means an aryl group and a substituted aryl group. The aryl group is preferably a phenyl group or a naphthyl group, more preferably a phenyl group. The number of carbon atoms in the monovalent aromatic group is preferably from 6 to 20, more preferably from 6 to 16. Examples of the monovalent aromatic group include a phenyl group, a p-tolyl group, a p-methoxyphenyl group, an o-chlorophenyl group and an m-(3-sulfopropylamino)phenyl group. The divalent aromatic group is a divalent form of these monovalent aromatic groups and examples thereof include a phenylene group, a p-tolylene group, a p-methoxyphenylene group, an o-chlorophenylene group, an m-(3-sulfopropyl-amino)phenylene group and a naphthylene group.

The heterocyclic group includes a heterocyclic group having a substituent and an unsubstituted heterocyclic group. The heterocyclic ring may be condensed with an aliphatic ring, an aromatic ring or another heterocyclic ring. The heterocyclic group is preferably a 5- or 6-membered heterocyclic group. Examples of the heteroatom in the heterocyclic ring include N, O and S. Examples of the substituent include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group. The divalent heterocyclic group is a group resulting from removing a hydrogen atom of those monovalent heterocyclic rings to form a bond.

The carbamoyl group includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes an acyloxy group having a substituent and an unsubstituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyloxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted by an alkyl group, an aryl group or a heterocyclic group, and the alkyl group, the aryl group and the heterocyclic group each may further have a substituent. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes an arylamino group having a substituent, an unsubstituted arylamino group and an anilino group. The arylamino group is preferably an arylamino group having from 6 to 20 carbon atoms. Examples of the substituent include a halogen atom and an ionic hydrophilic group. Examples of the arylamino group include a phenylamino group and a 2-chlorophenylamino group.

The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group, a halogen atom and an ionic hydrophilic group.

The acylamino group includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkylsulfonylamino group and the arylsulfonylamino group include an alkylsulfonylamino group having a substituent, an arylsulfonylamino group having a substituent, an unsubstituted alkylsulfonylamino group and an unsubstituted arylsulfonylamino group. The sulfonylamino group is preferably a sulfonylamino group having from 1 to 20 carbon atoms. Examples of the substituent include an ionic hydrophilic group. Examples of these sulfonylamino groups include a methylsufonylamino group, an N-phenylmethylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridinesulfinyl group.

The alkylthio group, the arylthio group and the heterocyclic thio group include an alkylthio group having a substituent, an arylthio group having a substituent, a heterocyclic thio group having a substituent, an unsubstituted alkylthio group, an unsubstituted arylthio group and an unsubstituted heterocyclic thio group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms. Examples of the substituent include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include an alkylsulfonyl group having a substituent, an arylsulfonyl group having a substituent, an unsubstituted alkylsulfonyl group and an unsubstituted arylsulfonyl group. Examples of the alkylsulfonyl group and arylsulfonyl group include a methylsulfonyl group and a phenylsulfonyl group.

The alkylsulfinyl group and the arylsulfinyl group include an alkylsulfinyl group having a substituent, an arylsulfinyl group having a substituent, an unsubstituted alkylsulfinyl group and an unsubstituted arylsulfinyl group. Examples of the alkylsulfinyl group and arylsulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Formulae 1, 7 and 8 are described below.

In formula 1, $A_1$, $A_2$ and $A_3$ each independently represents an aromatic group which may be substituted, or a heterocyclic group which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

At least one of $A_1$ and $A_2$ are preferably an aromatic heterocyclic group.

$A_3$ is preferably an aromatic heterocyclic group, more preferably an aromatic nitrogen-containing heterocyclic group, still more preferably pyridine, pyrimidine, pyridazine or pyrazine, particularity preferably an aromatic nitrogen-containing 6-membered heterocyclic group represented by the following formula 14. When $A_3$ is an aromatic nitrogen-containing 6-membered heterocyclic group represented by formula 14, formula 1 corresponds to formula 7.

Formula 14:

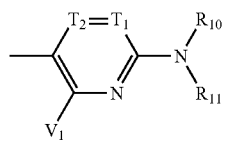

In formula 14, $T_1$ and $T_2$ each represents =CR$_{12}$— or —CR$_{13}$= or either one of $T_1$ and $T_2$ represents a nitrogen atom and the other represents =CR$_{12}$— or —CR$_{13}$=. $T_1$ and $T_2$ each is preferably =CR$_{12}$— or —CR$_{13}$=.

$R_{10}$ and $R_{11}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, where each group may further have a substituent. The substituent represented by $R_{10}$ and $R_{11}$ is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group. Each group may further have a substituent. However, $R_{10}$ and $R_{11}$ are not a hydrogen atom at the same time.

$V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, where each group may be further substituted.

The substituent represented by $V_1$ is preferably a hydrogen atom, a halogen atom, an aliphatic group, an aromatic group, a hydroxyl group, an alkoxy group, an aryloxy group, an acyloxy group, a heterocyclic oxy group, an amino group (including an anilino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group (including an anilino group and a heterocyclic amino group) or an acylamino group, and most preferably a hydrogen atom, an anilino group or an acylamino group. Each group may further have a substituent.

The substituents represented by $R_{12}$ and $R_{13}$ each is preferably a hydrogen atom, an alkyl group, a halogen atom, an alkoxycarbonyl group, a carboxyl group, a carbamoyl group, a hydroxy group, an alkoxy group or a cyano group. Each group may further have a substituent.

$R_{11}$ and $R_{10}$, or $R_{10}$ and $R_{11}$ may combine to form a 5- or 6-membered ring.

When the substituents represented by $A_1$, $R_{12}$, $R_{13}$, $R_{10}$, $R_{11}$, and $V_1$ each further has a substituent, examples of the substituent include the substituents described above for $V_1$, $R_{10}$ and $R_{11}$. Also, an ionic hydrophilic group is preferably further present as a substituent on any one position of $A_1$, $R_8$, $R_9$, $R_{10}$, $R_{11}$, and $V_1$.

Examples of the ionic hydrophilic group as the substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion).

When $A_2$ has a ring structure in the formula (1) or (7), preferred examples of the heterocyclic ring include a thiophene ring, a thiazole ring, an imidazole ring, a benzothiazole ring and a thienothiazole ring. Each heterocyclic group may further have a substituent. Among these hetero cyclic rings, a thiophene ring, a thiazole ring, an imidazole ring, a benzothiazole ring and a thienothiazole ring represented by the following formulae (a) to (e) are preferred. $A_2$ is preferably a thiophene ring represented by formula (a) or thiazole ring represented by formula (b). When $A_3$ is a structure represented by formula 14, formula 1 corresponds to formula 8.

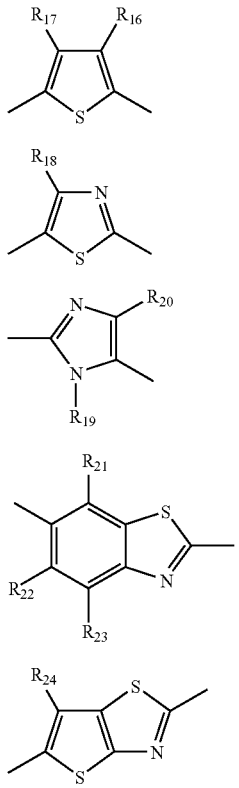

wherein $R_{16}$ to $R_{24}$ each represents a substituent having the same meaning as $V_1$, $R_{12}$ and $R_{13}$ in formula 14.

$A_2$ may further have a substituent, and the examples of the substituent include a halogen atom, an alkyl group (including a cycloalkyl group and bicycloalkyl group), an alkenyl group (including a cycloalkenyl group and bicycloalkenyl group), an alkynyl group, an aryl group, a heterocyclic group, a cyano group, a hydroxyl group, a nitro group, carboxyl group, an alkoxy group, aryloxy group, silyloxy group, a heterocyclic oxy group, an acyloxy group, a carbamoyloxy group, an alkoxycarbonyloxy group, an aryloxycarbonyloxy group, an amino group (including anilino group), an acylamino group, an aminocarbonylamino group, an alkoxycarbonylamino group, an aryloxycarbonylamino group, a sulfamoylamino group, an alkylsulfonylamino group, an arylsulfonylamino group, mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, aryloxycarbonyl group, alkoxycarbonyl group, a carbamoyl group, arylazo group, heterocyclic azo group, imido group, a phosphino group, a phosphono group, a phosphinyl group, a phosphinyloxy group, a phosphinylamino group, and a silyl group.

When the above functional group has a hydrogen atom, the functional group may further have the above-mentioned substituent in place of the hydrogen atom. The examples of the substituent include an alkylcarbonylaminosulfonyl group, an arylcarbonylaminosulfonyl group, an alkylsulfonylaminocarbonyl group and an arylsulfonylaminocarbonyl group.

In the formulae (a) to (e), the substituents on the heterocyclic ring may combine from each other to form a condensed ring with a hydrocarbon ring or a heterocyclic ring. The condensed ring may have further substituent. When the condensed ring is a nitrogen-containing heterocyclic ring, the nitrogen atom in the nitrogen-containing heterocyclic ring may be quaternary. In the case of a heterocyclic ring having a tautomeric form, even if only one tautomeric form is described, the other tautomeric form is included.

In the present invention, the structure represented by the following formula 15 or 15-2 is particularly preferred:

Formula 15:

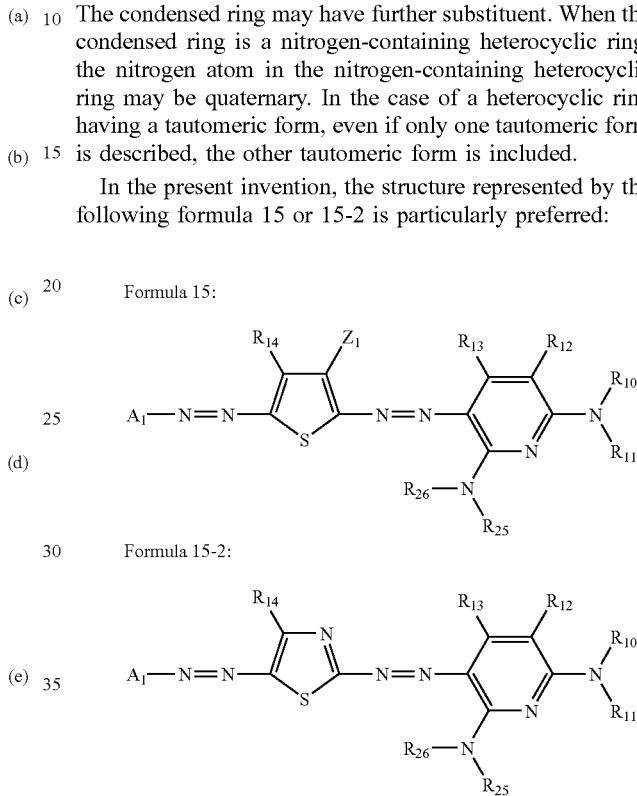

Formula 15-2:

In formula 15, $Z_1$ represents an electron-withdrawing group having a Hammett's substituent constant σp value of 0.20 or more. $Z_1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$R_{10}$, $R_{11}$, $R_{12}$ and $R_{13}$ have the same meanings as in formula 7. $R_{25}$ and $R_{26}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, preferably a hydrogen atom, an aromatic group, a hetero cyclic group, an acyl group, an alkylsulfonyl group or an arylsulfonyl group, more preferably a hydrogen atom, an aromatic group or a heterocyclic group.

$R_{14}$ in the formulae 15 and 15-2 have the same meanings as $V_1$, $R_{12}$ or $R_{13}$ in formula 7, and preferably an aromatic group, a heterocyclic group or an alkyl group, more preferably an aromatic group, still more preferably a phenyl group which may have a substituent, or a naphthyl group which may have a substituent.

The groups described in regard to formula 15 each may further have a substituent. When these groups each further has a substituent, examples of the substituent include the substituents described in regard to formula 7, the groups described as examples for $V_1$, $R_{10}$ and $R_{11}$, and an ionic hydrophilic group.

Here, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo (1979). In the present invention, each substituent is limited or described using the Hammett's substituent constant σp but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formulae 1 and 7 of the present invention include those which are not a benzene derivative, the σp value is used as a measure for showing the electron effect of the substituent irrespective of the substitution site. In the present invention, the σp value is used in this meaning.

Examples of the electron-withdrawing group having a Hammett's substituent constant σp value of 0.60 or more include a cyano group, a nitro group, an alkylsulfonyl group (e.g., methylsulfonyl and an arylsulfonyl group (e.g., phenylsulfonyl group)).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

In the azo dye represented by formula 8, the following combination of substituents is particularly preferred. $R_{10}$ and $R_{11}$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R_{10}$ and $R_{11}$ are not a hydrogen atom at the same time.

$V_1$ is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

$A_1$ is preferably a benzene ring, a naphthalene ring, a pyridine ring, an imidazole ring or a pyrazole ring, and most preferably a benzene ring or a naphthalene ring.

$T_1$ and $T_2$ each is =$CR_{12}$— or —$CR_{13}$=, and $R_{12}$ and $R_{13}$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula 1, a compound where at least one of various substituents is the preferred group is preferred, a compound where a larger number of various substituents are the preferred groups is more preferred, and a compound where all substituents are the preferred groups is most preferred.

Specific examples of the azo dye represented by formula 1 are set forth below, however, the azo dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion). As the counter ion, ammonium ion, organic cation and lithium ion are preferable, and lithium ion is more preferable.

TABLE 1
| | A—N=N—B—N=N—C | | |
|---|---|---|---|
| | A | B | C |
| (a-1) | 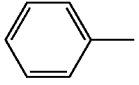 | 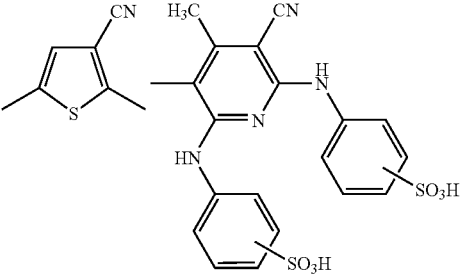 | 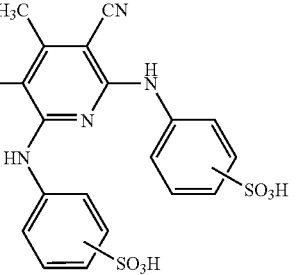 |
| (a-2) | 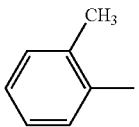 | 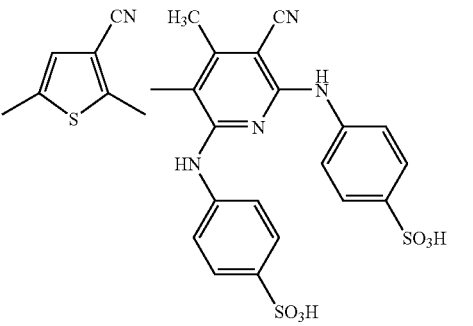 | 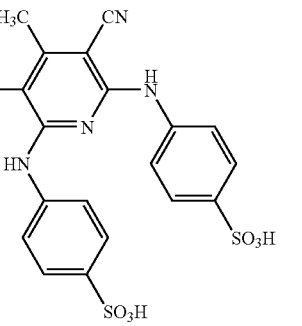 |
| (a-3) | 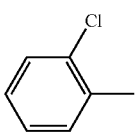 | 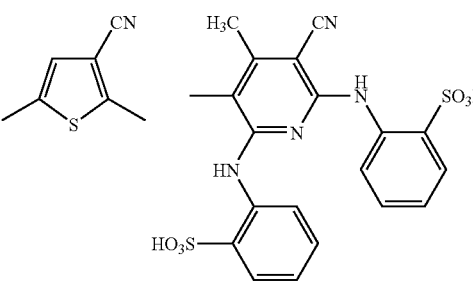 | 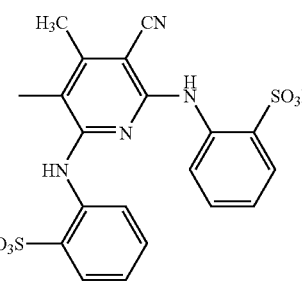 |
| (a-4) | 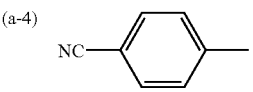 | 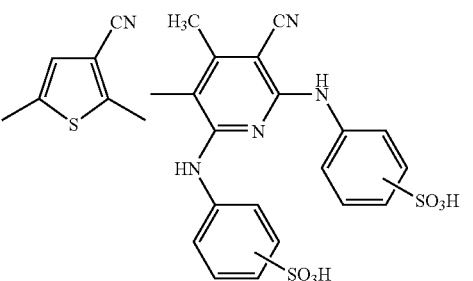 | 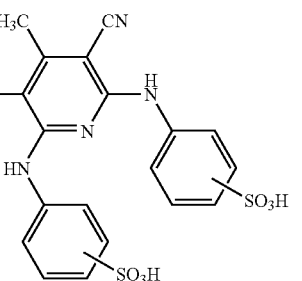 |
| (a-5) | 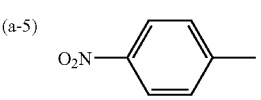 | 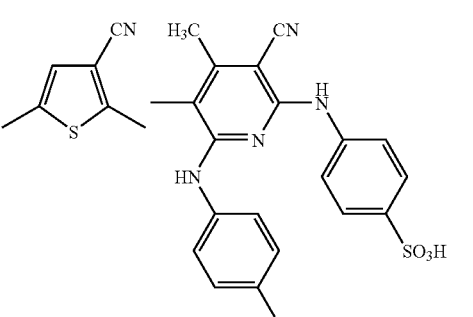 | 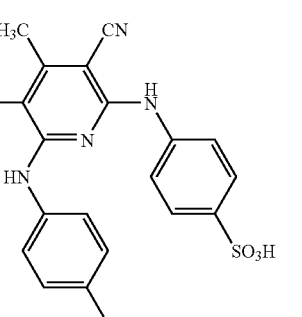 |

TABLE 1-continued

A—N=N—B—N=N—C

| | A | B | C |
|---|---|---|---|
| (a-6) | 3-methylpyridine | 2,5-dimethyl-3-cyanothiophene | 4-methyl-3-methyl-5-cyano-2-(2-sulfophenylamino)-6-(2-sulfophenylamino)pyridine |

TABLE 2

A—N=N—B—N=N—C

| | A | B | C |
|---|---|---|---|
| (b-1) | 4-sulfophenyl | 2,5-dimethyl-3-cyanothiophene | 4-methyl-3-methyl-5-cyano-2-(4-sulfophenylamino)-6-(4-sulfophenylamino)pyridine |
| (b-2) | 2-methyl-1,4-disulfophenyl | 2,5-dimethyl-3-cyanothiophene | 4-methyl-3-methyl-5-cyano-2-(4-sulfophenylamino)-6-(4-sulfophenylamino)pyridine |
| (b-3) | 2-methyl-1,4-dicarboxyphenyl | 2,5-dimethyl-3-cyanothiophene | 4-methyl-3-methyl-5-cyano-2-(2-sulfophenylamino)-6-(2-sulfophenylamino)pyridine |

TABLE 2-continued
A—N=N—B—N=N—C
| A | B | C |
|---|---|---|
| (b-4) 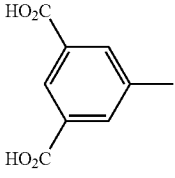 | 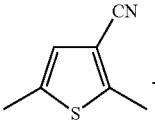 | 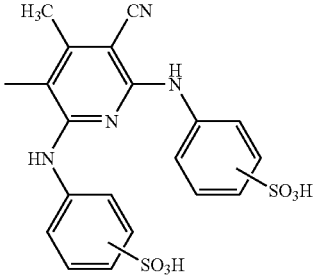 |
| (b-5) 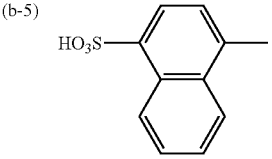 | 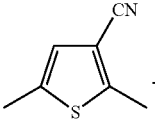 | 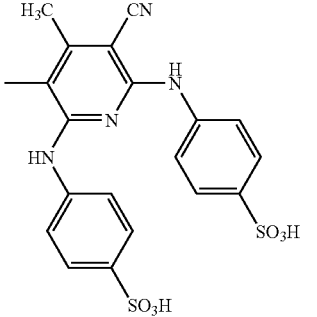 |
| (b-6) 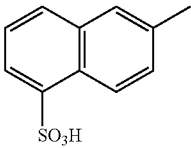 | 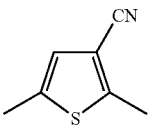 | 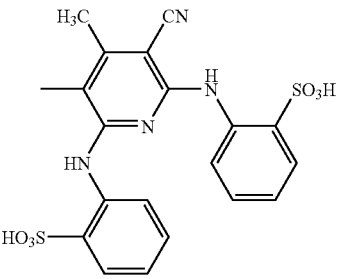 |
| (b-7) 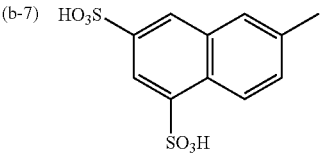 | 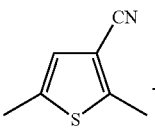 | 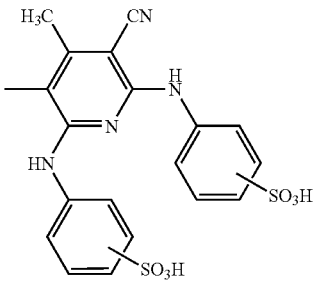 |

TABLE 3

A—N=N—B—N=N—C

| | A | B | C |
|---|---|---|---|
| (c-1) | | | |
| (c-2) | | | |
| (c-3) | | | |
| (c-4) | | | |

TABLE 3-continued

A—N=N—B—N=N—C

| | A | B | C |
|---|---|---|---|
| (c-5) | phenyl-N=N-(4-methylphenyl)- | 2,5-dimethylthiophene-3-CN | 3,4,5-trimethylpyridine with two NH-(2-sulfophenyl) substituents |

TABLE 4

A—N=N—B—N=N—C

| | A | B | C |
|---|---|---|---|
| (d-1) | 3-sulfophenyl (HO₃S-) | 2,5-dimethylthiazole | 4,5-dimethylpyridine with N(benzothiazole-SO₃H)(phenyl-SO₃H) and NH-(phenyl-SO₃H) |
| (d-2) | 4-carboxyphenyl (HO₂C-) | 2,5-dimethylthiazole | 4,5-dimethyl-3-cyanopyridine with NH-(phenyl-SO₃H) groups |
| (d-3) | 4-carboxybiphenyl (HO₂C-) | 2,5-dimethyl-4-phenylthiazole | 4,5-dimethyl-3-cyanopyridine with NH-(phenyl-SO₃H) groups |

TABLE 4-continued

| | A—N=N—B—N=N—C | | |
|---|---|---|---|
| | A | B | C |

(d-4) — structures shown (d-5) — structures shown (d-6) — structures shown

TABLE 5

| | A—N=N—B—N=N—C | | |
|---|---|---|---|
| | A | B | C |

(e-1) — structures shown

TABLE 5-continued
A—N=N—B—N=N—C
| A | B | C |
|---|---|---|
| (e-2) | | |
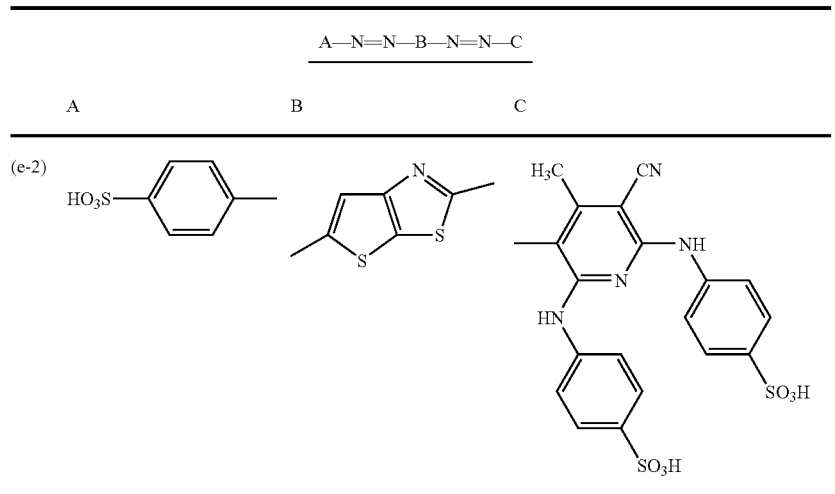
TABLE 6
A—N=N—B—N=N—C
| A | B | C |
|---|---|---|
| (f-1) | | |
| (f-2) | | |
| (f-3) | | |
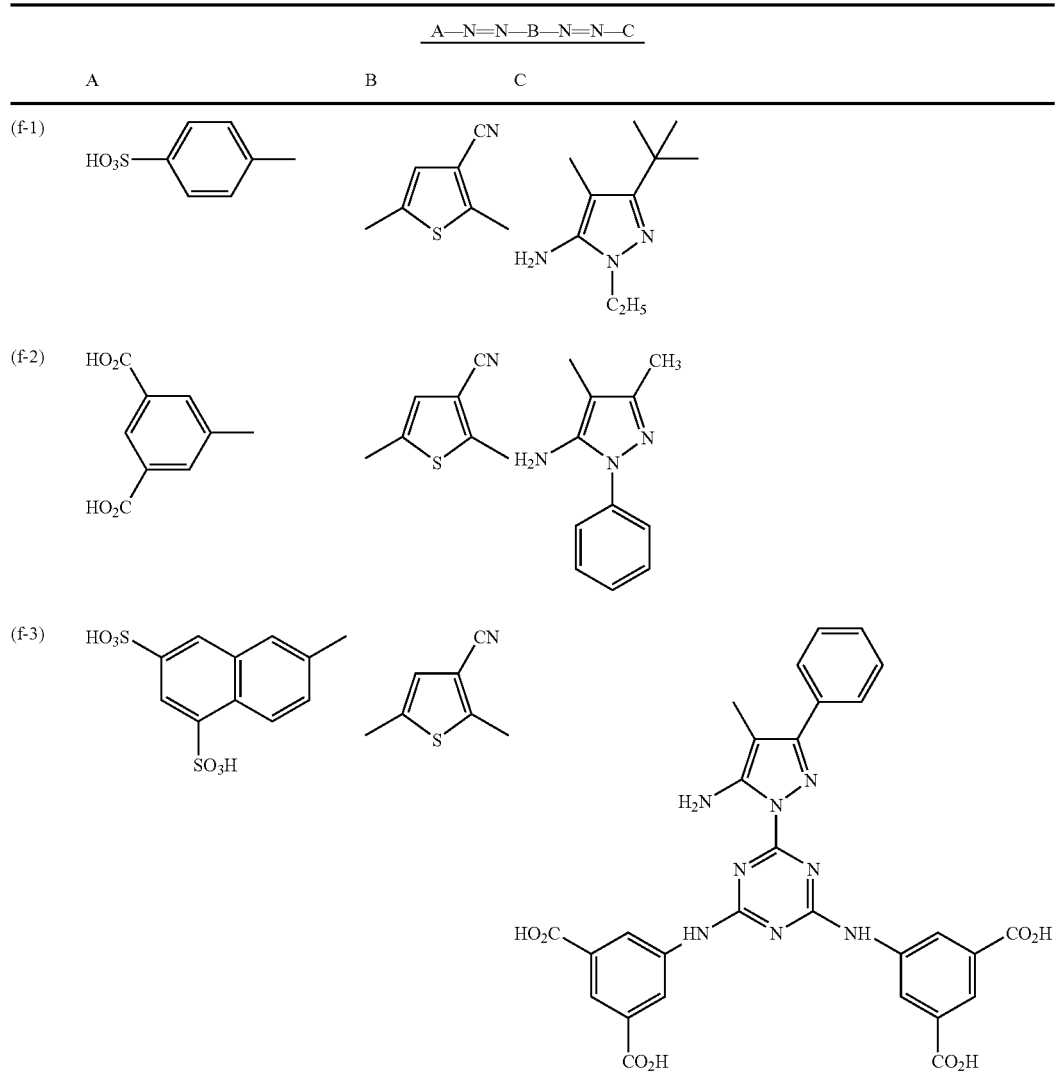

TABLE 6-continued
A—N=N—B—N=N—C
| A | B | C |
|---|---|---|
| (f-4) 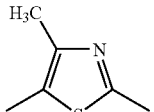 | 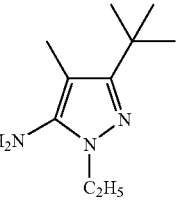 | 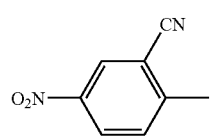 |
TABLE 7
A—N=N—B—N=N—C
| A | B | C |
|---|---|---|
| 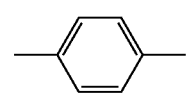 | 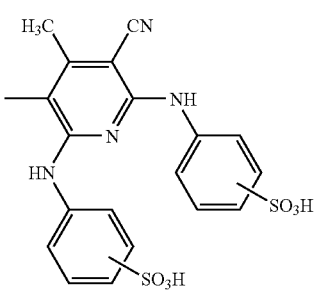 | 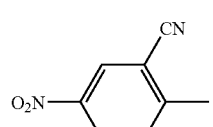 |
| 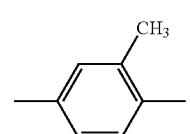 | 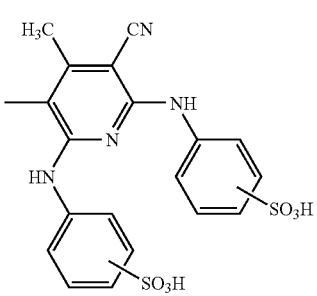 | 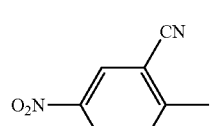 |
| 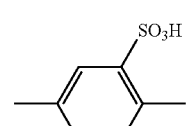 | 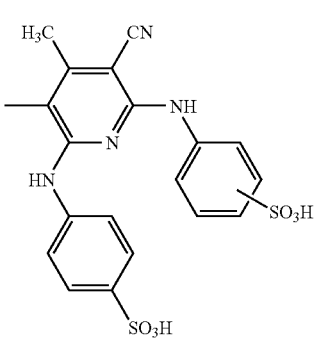 | |

TABLE 7-continued
A—N=N—B—N=N—C
| A | B | C |
|---|---|---|
| 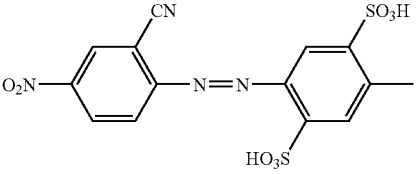 |  | 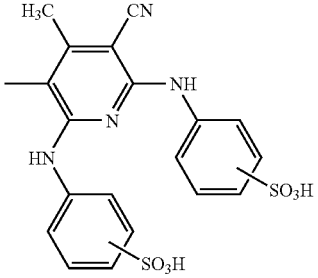 |
| 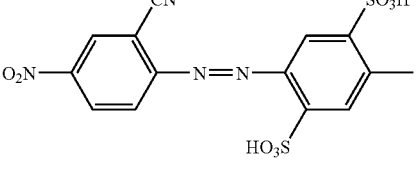 | 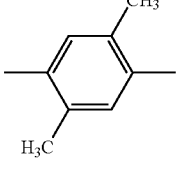 | 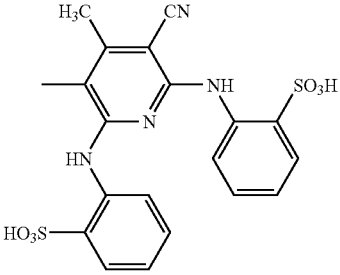 |
| 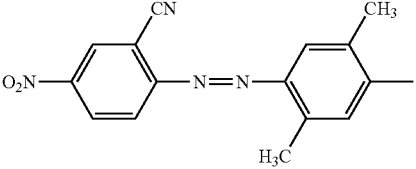 | 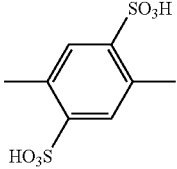 | 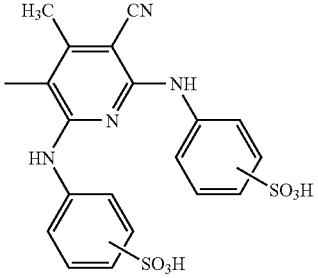 |
TABLE 8
| A | B | C |
|---|---|---|
| 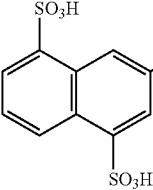 | 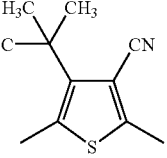 | 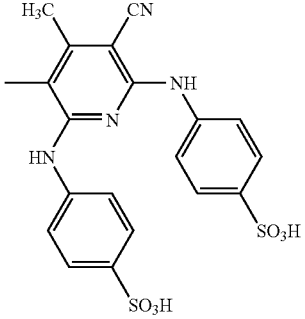 |

TABLE 8-continued
| A | B | C |
|---|---|---|
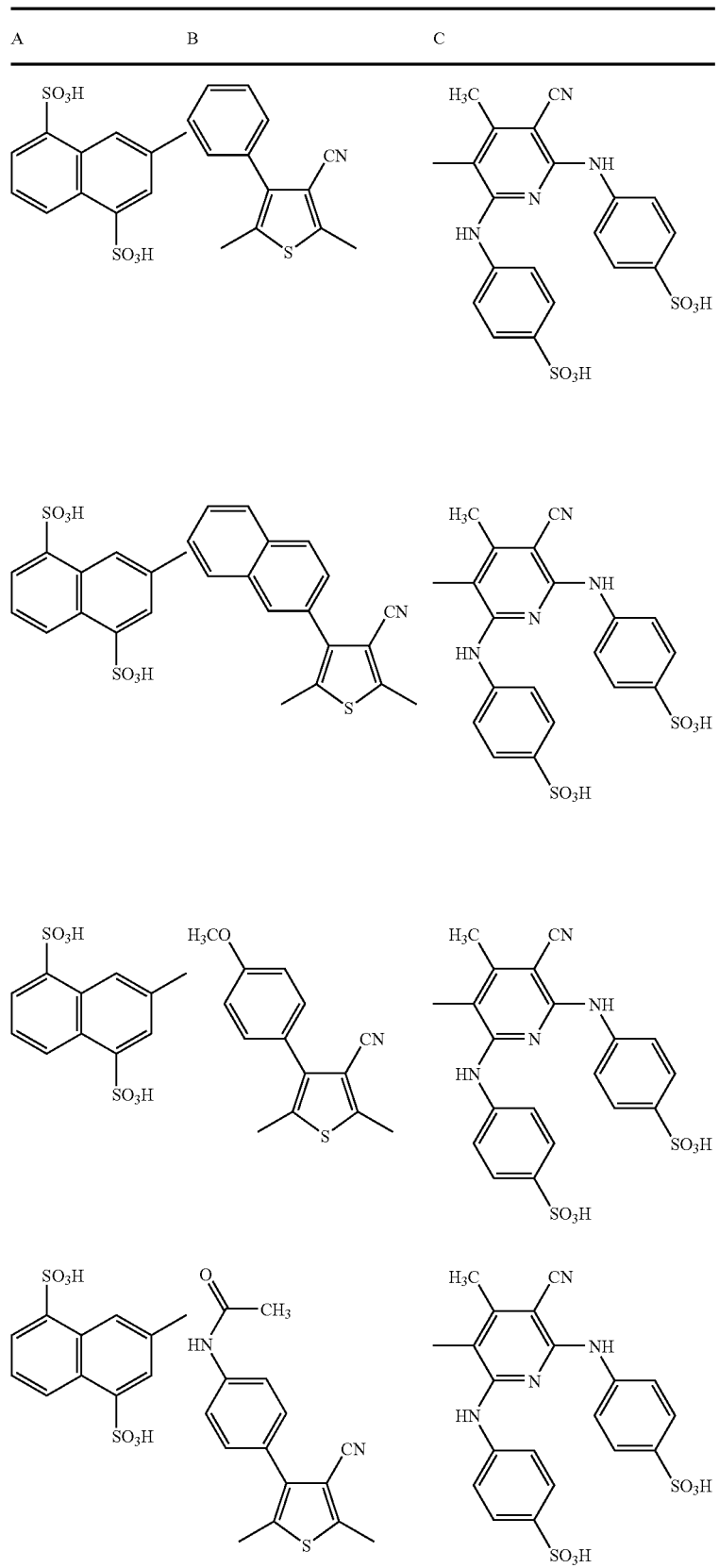

TABLE 8-continued
| A | B | C |
|---|---|---|
| 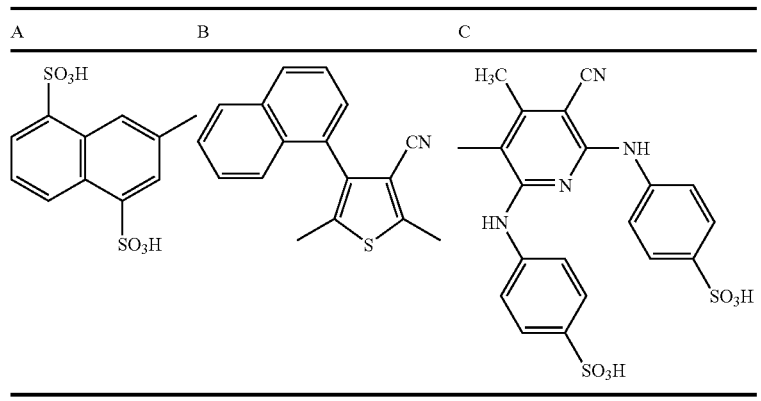 | | |
TABLE 9
| A | B | C |
|---|---|---|
| 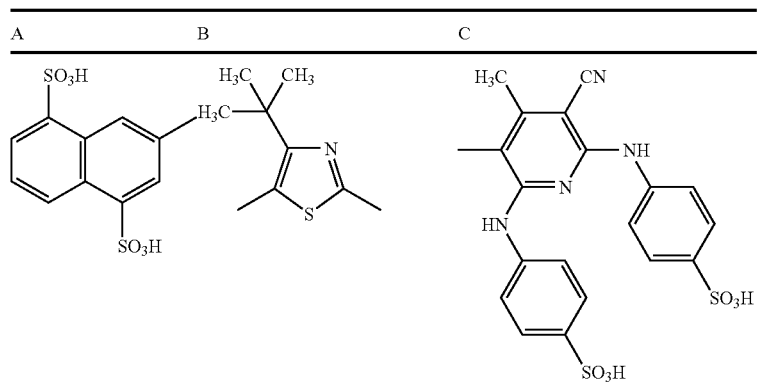 | | |
| 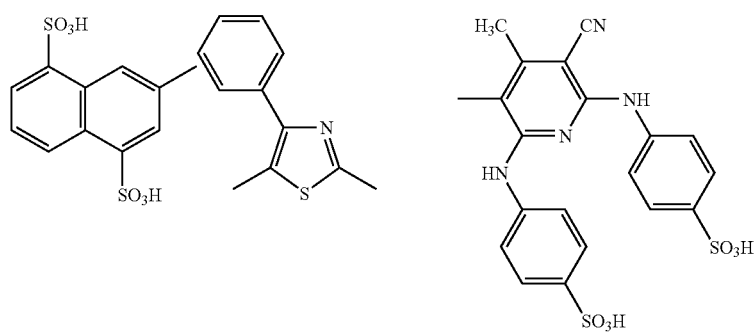 | | |
| 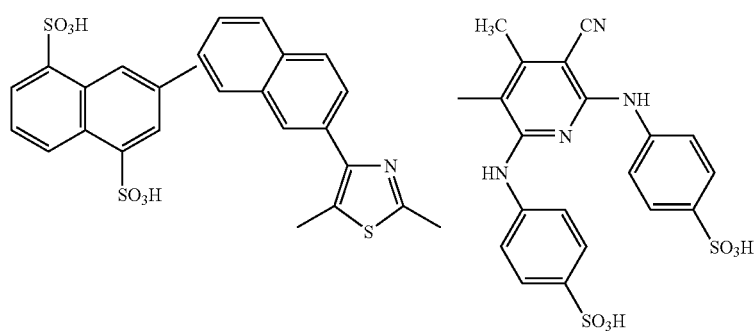 | | |

TABLE 9-continued
| A | B | C |
|---|---|---|
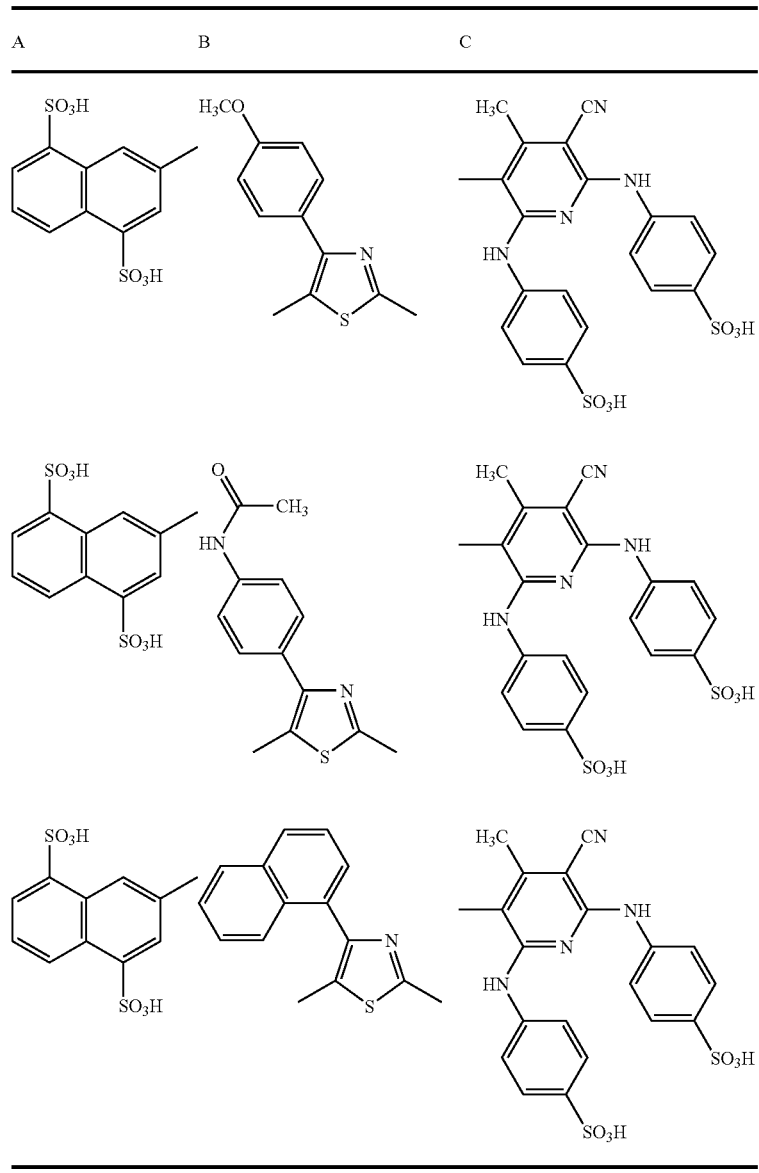
TABLE 10
| A | B | C |
|---|---|---|
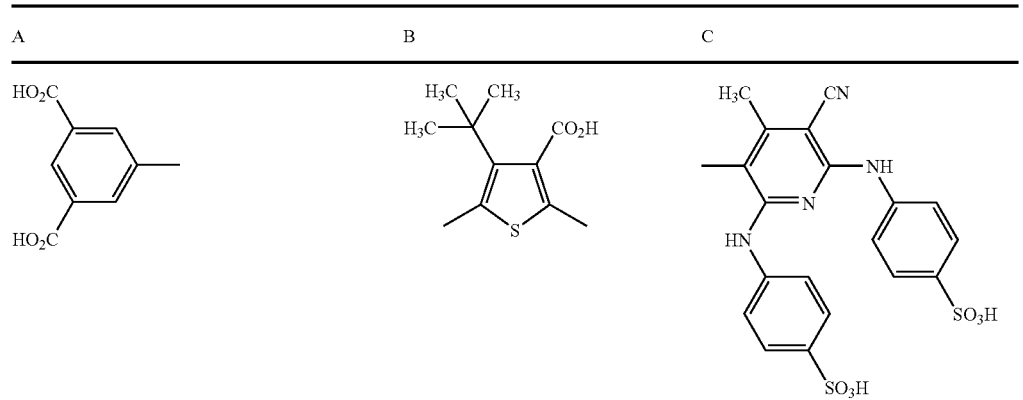

TABLE 10-continued
| A | B | C |
|---|---|---|
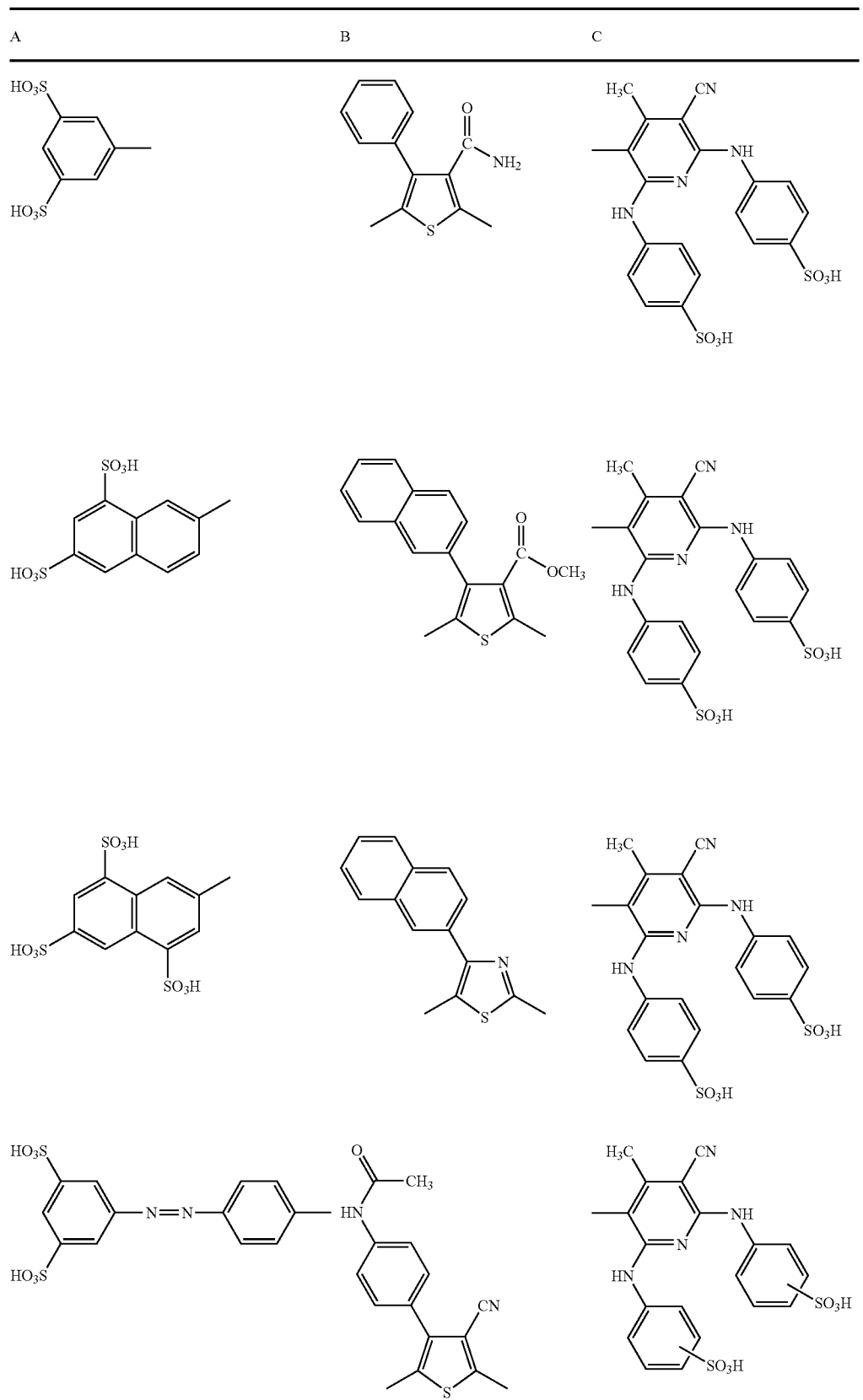

TABLE 10-continued
| A | B | C |
|---|---|---|
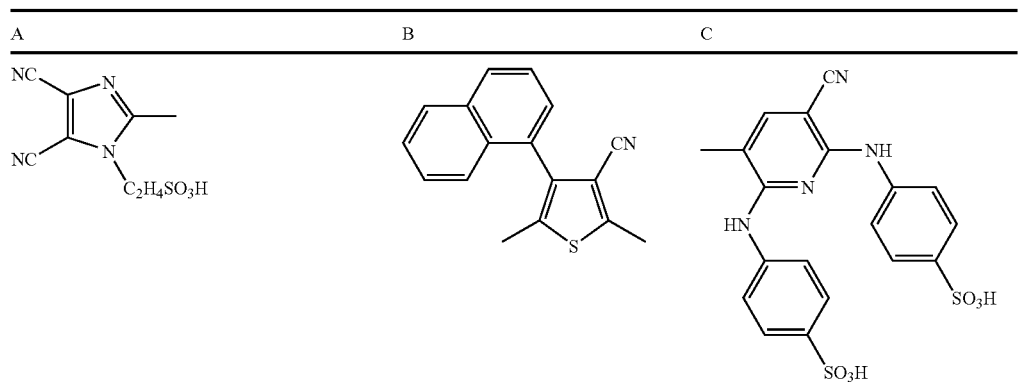
TABLE 11
| A | B | C |
|---|---|---|
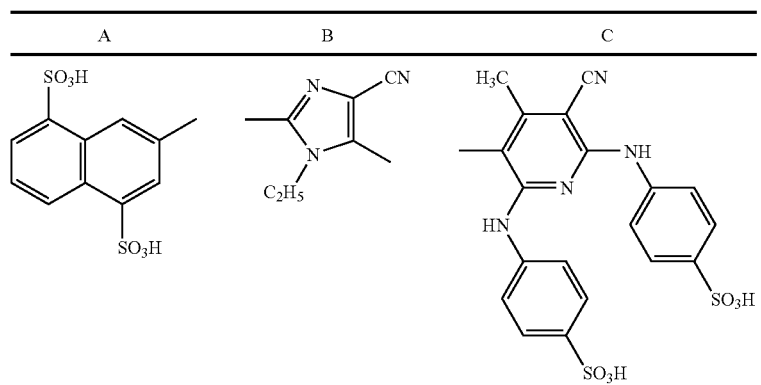
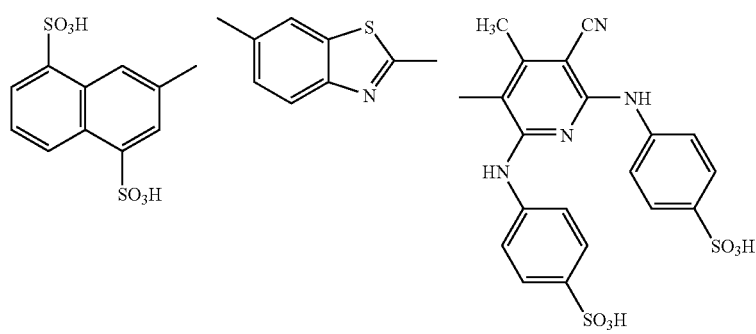
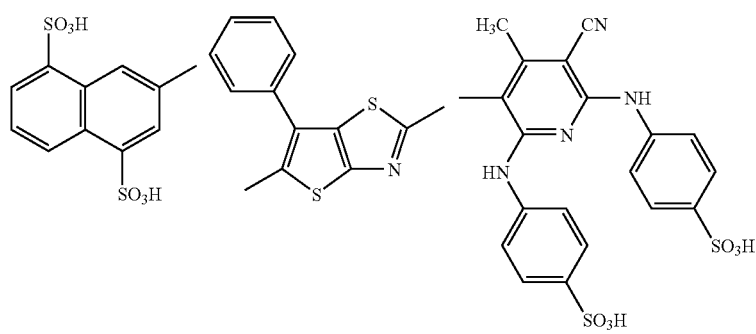

TABLE 11-continued
| A | B | C |
|---|---|---|
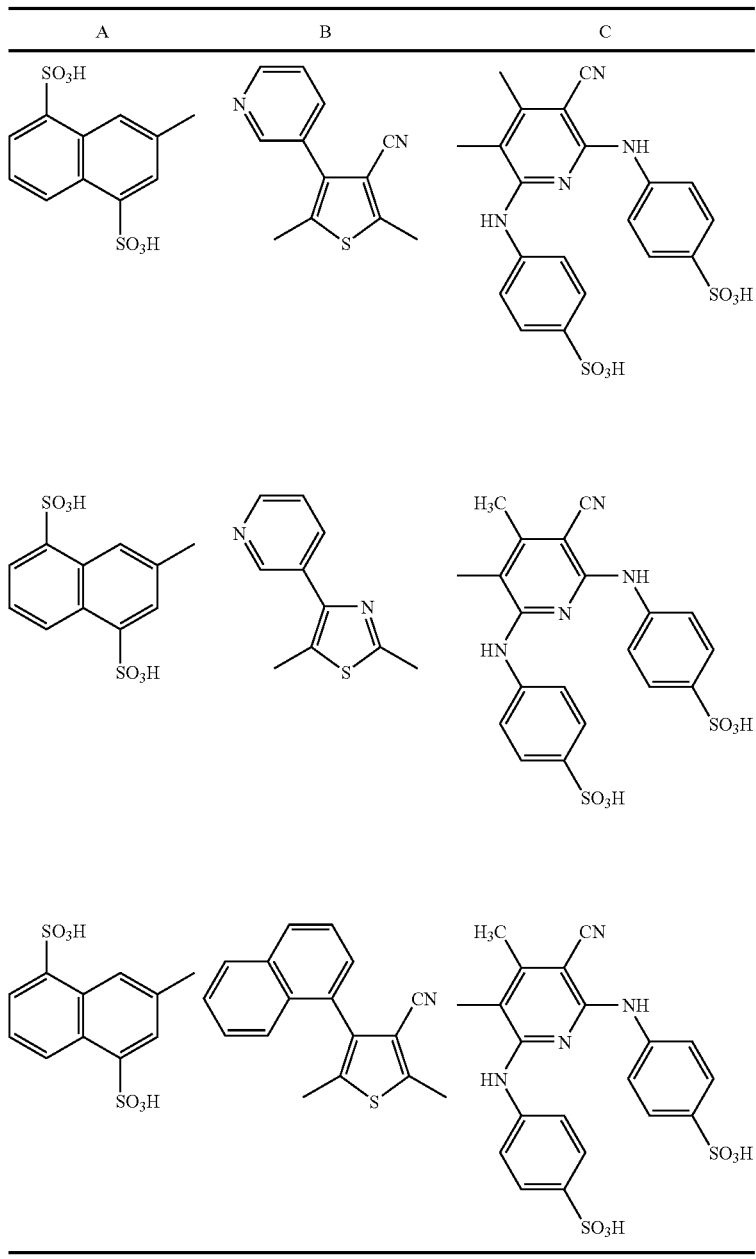
TABLE 12
| A | B | C |
|---|---|---|
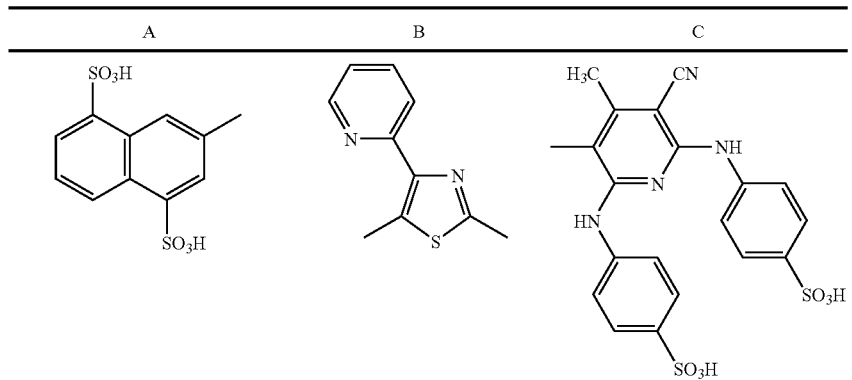

TABLE 12-continued
| A | B | C |
|---|---|---|
| 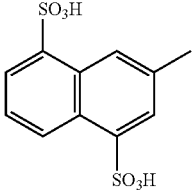 | 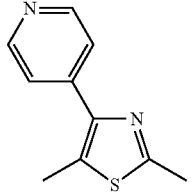 | 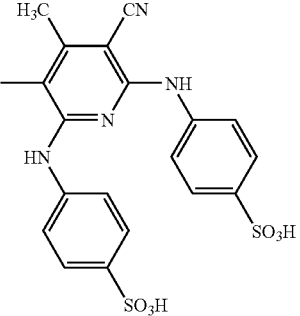 |
| 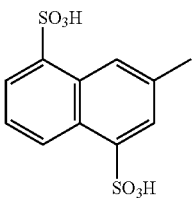 | 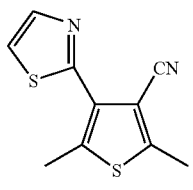 | 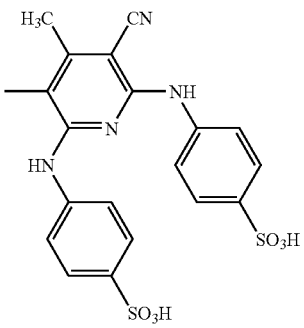 |
| 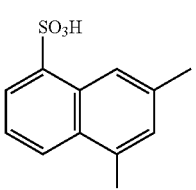 | 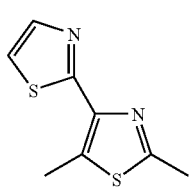 | 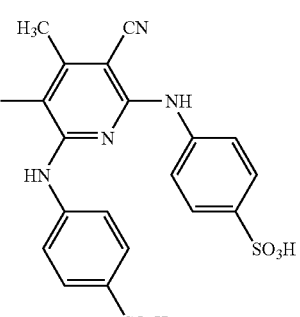 |
| 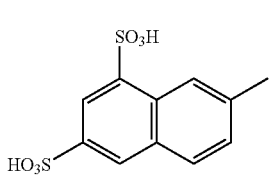 | 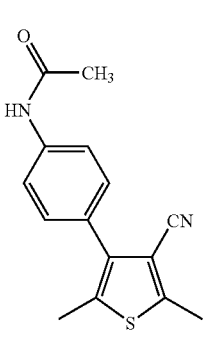 | 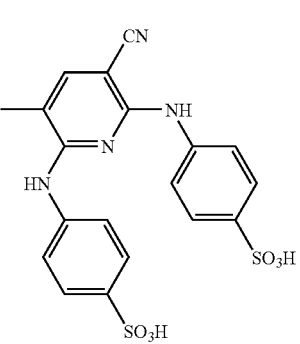 |

TABLE 12-continued

| A | B | C |
|---|---|---|
| 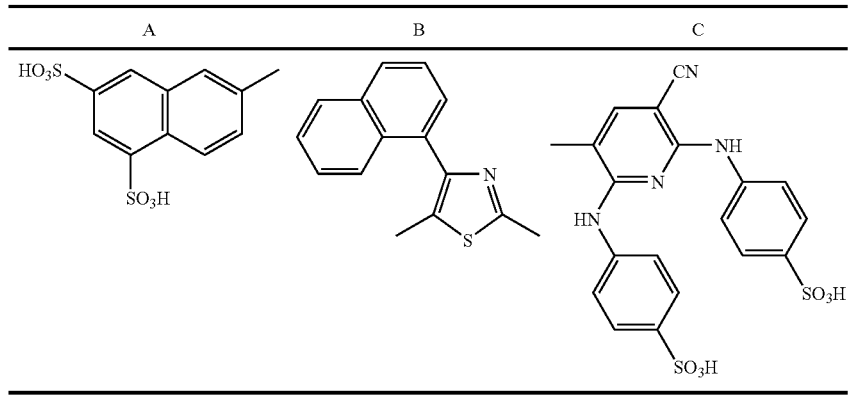 | | |

Formulae 2 and 9 are described below.

In the following, those described above for each group or substituent also apply.

In formula 2, $B_1$ and $B_2$ each independently represents an aromatic group ($B_1$ is a monovalent aromatic group such as aryl group, and $B_2$ is a divalent aromatic group such as arylene group) which may be substituted, or a heterocyclic group ($B_1$ is a monovalent heterocyclic group and $B_2$ is a divalent heterocyclic group) which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

$D_1$ represents an arbitrary substituent and preferred examples of the substituent represented by $D_1$ include a group represented by the following formula 16:

When $D_1$ is a group represented by formula 16, formula 2 corresponds to formula 9. In formula 9, $B_3$ and $B_4$ each independently represents an aromatic group ($B_4$ is a monovalent aromatic group such as aryl group, and $B_3$ is a divalent aromatic group such as arylene group) which may be substituted, or a heterocyclic group ($B_4$ is a monovalent heterocyclic group and $B_3$ is a divalent heterocyclic group) which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

Specific examples of the azo dye represented by formula 2 are set forth below, however, the azo dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion). As the counter ion, ammonium ion, organic cation and lithium ion are preferable, and lithium ion is more preferable.

TABLE 13

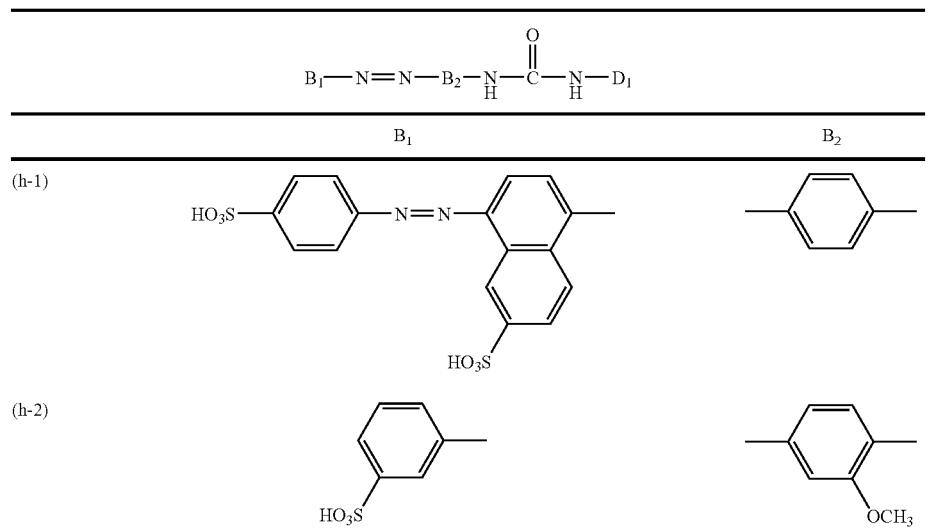

TABLE 13-continued
| | | |
|---|---|---|
| (h-3) | 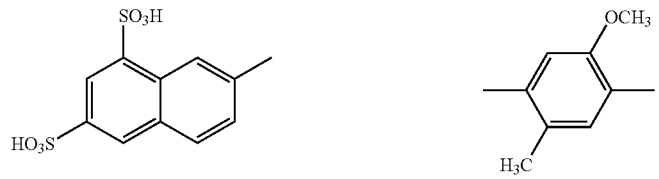 | 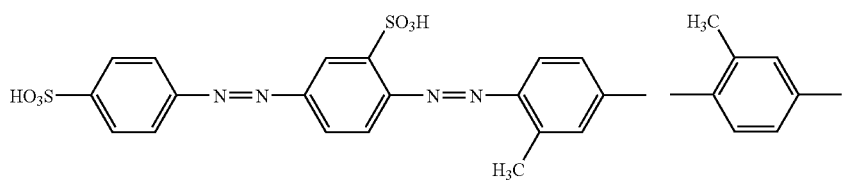 |
| (h-4) | 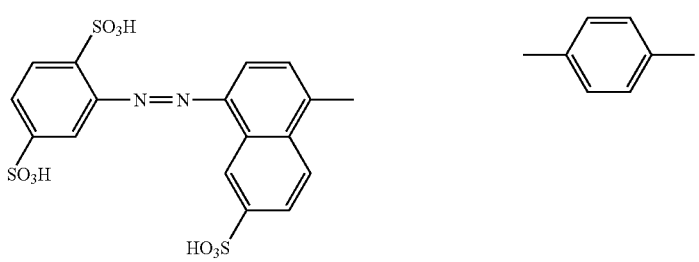 | 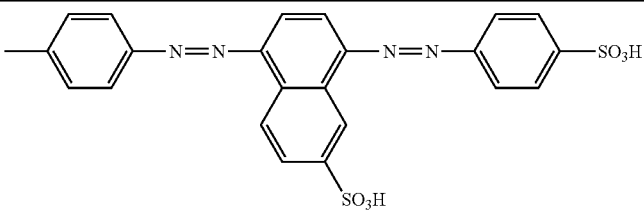 |
| (h-5) | 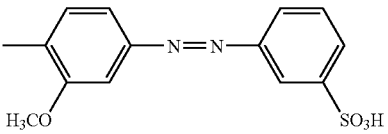 | 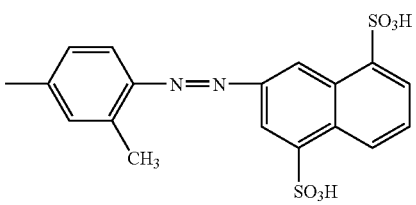 |
| (h-6) | | |
| D₁ |
|---|
| (h-1) |
| (h-2) |
| (h-3) |

TABLE 13-continued $$B_1-N=N-B_2-\underset{H}{N}-\overset{O}{\underset{\|}{C}}-\underset{H}{N}-D_1$$

(h-4)

(h-5)

(h-6)

---

Formulae 3 and 10 are described below.

In the following, those described above for each group or substituent also apply.

In formula 3, $E_1$ and $E_2$ each independently represents an aromatic group ($E_1$ is a monovalent aromatic group such as aryl group, and $E_2$ is a divalent aromatic group such as arylene group) which may be substituted, or a heterocyclic group ($E_1$ is a monovalent heterocyclic group and $E_2$ is a divalent heterocyclic group) which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

$F_1$ represents an arbitrary substituent and preferred examples of the heterocyclic group represented by $F_1$ include a group represented by the following formula 17:

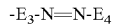 Formula 17

When $F_1$ is a group represented by formula 17, formula 3 corresponds to formula 10. $R_1$ represents a monovalent substituent such as hydrogen atom, halogen atom, hydroxyl group, alkoxy group, amino group, sulfo group and heterocyclic group. In formula 10, $E_3$ and $E_4$ each independently represents an aromatic group ($E_4$ is a monovalent aromatic group such as aryl group, and $E_3$ is a divalent aromatic group such as arylene group) which may be substituted, or a heterocyclic group ($E_4$ is a monovalent heterocyclic group and $E_3$ is a divalent heterocyclic group) which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

Specific examples of the azo dye represented by formula 3 are set forth below, however, the azo dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion). As the counter ion, ammonium ion, organic cation and lithium ion are preferable, and lithium ion is more preferable.

TABLE 14
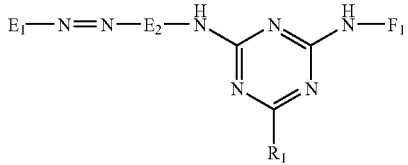
| $E_1$ | $E_2$ |
|---|---|
| 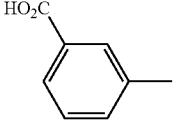 | 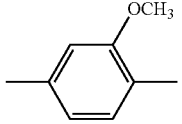 |
| 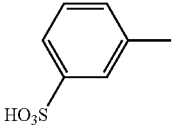 | 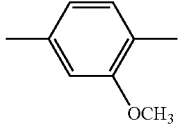 |
| 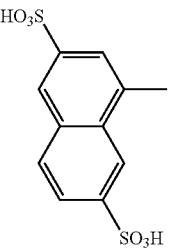 | 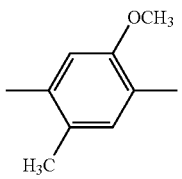 |
| 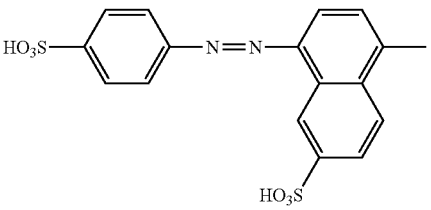 | 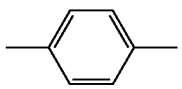 |
| 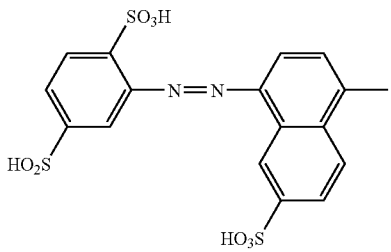 | 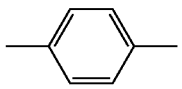 |
| $F_1$ | $R_1$ |
|---|---|
| 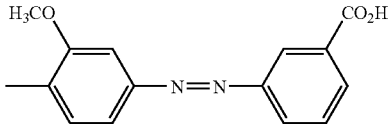 | —OH |
| 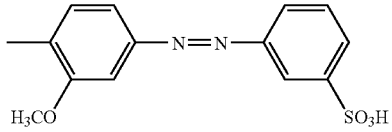 | —NHC$_2$H$_4$OH |

TABLE 14-continued

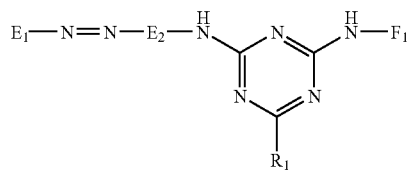

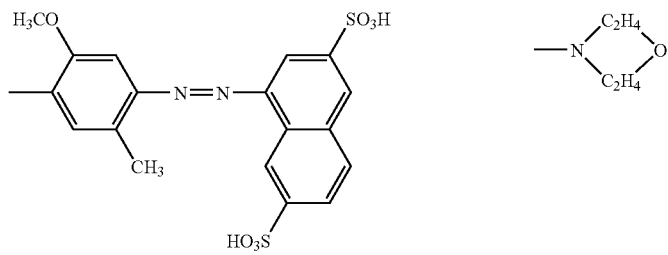

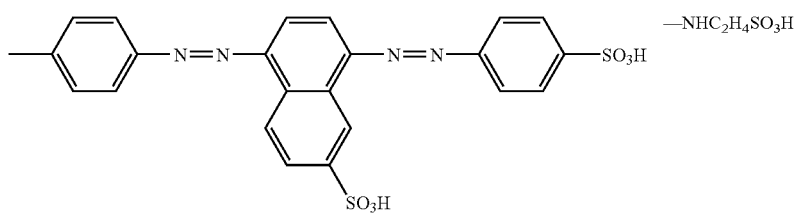

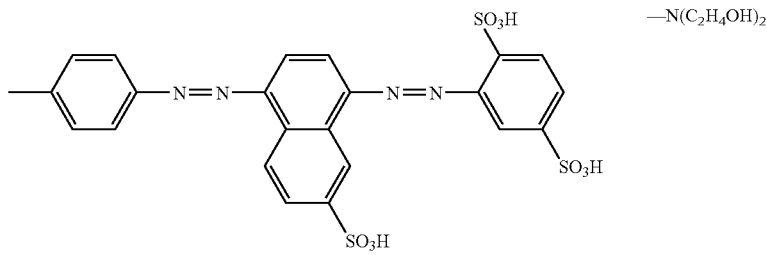

Formula 4 is described below.

In the following, those described above for each group or substituent also apply.

In formula 4, $G_1$ and $G_2$ each independently represents an aromatic group ($G_1$ is a monovalent aromatic group such as aryl group, and $G_2$ is a divalent aromatic group such as arylene group) which may be substituted, or a heterocyclic group ($G_1$ is a monovalent heterocyclic group and $G_2$ is a divalent heterocyclic group) which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

$R_2$ represents an arbitrary substituent except for hydrogen and examples thereof include an alkyl group and an acyl group, where each group may have a substituent.

Specific examples of the azo dye represented by formula 4 are set forth below, however, the azo dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion). As the counter ion, ammonium ion, organic cation and lithium ion are preferable, and lithium ion is more preferable.

TABLE 15

G₁—N=N—G₂—O—R₂

| G₁ | G₂ | R₂ |
|---|---|---|
| HO₃S—C₆H₄—N=N—C₆H₂(OCH₃)(CH₃)(H₃C)— | —C₆H₄— (p-tolyl) | —CH₃ |
| HO₃S—C₆H₄— (m-) | C₆H₃(OCH₃)(CH₃)— | —CH₃ |
| naphthyl with SO₃H, HO₃S, CH₃ | C₆H₂(OCH₃)(CH₃)(H₃C)— | —CH₃ |

Formula 5 is described below.

In the following, those described above for each group or substituent also apply. In formula 5, $R_3$ and $R_5$ each represents a hydrogen atom, an alkyl group, a cycloalkyl group, an aralkyl group, an alkoxy group or an aryl group, $R_4$ represents a hydrogen atom, an alkyl group, a cycloalkyl group, an aralkyl group, a carbamoyl group, an acyl group, an aryl group or a heterocyclic group, and $J_1$ represents an aromatic group which may be substituted or a heterocyclic group which may b substituted.

Specific examples of the azo dye represented by formula 5 are set forth below, however, the azo dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion). As the counter ion, ammonium ion, organic cation and lithium ion are preferable, and lithium ion is more preferable.

TABLE 16

$J_1$—N=N—[pyrazole ring with $R_3$, $R_4$, $R_5$—NH—]

| J₁ | R₃ | R₄ | R₅ |
|---|---|---|---|
| thiadiazole-methyl | —(t)C₄H₉ | C₆H₄—SO₃H (p-) | —H |
| thiadiazole-methyl | —(t)C₄H₉ | C₆H₃(CO₂H)₂ (3,5-) | —H |

TABLE 16-continued

| J₁ | R₃ | R₄ | R₅ |
|---|---|---|---|
| (2-methyl-1,3,4-thiadiazol-5-yl) | —(t)C₄H₉ | 4-sulfo-3-methyl-phenyl with SO₃H | —H |
| 2-cyanophenyl (with methyl) | —(t)C₄H₉ | 3,5-dicarboxyphenyl (methyl substituted) | —H |
| 4-cyanophenyl (with methyl) | —(t)C₄H₉ | 4-sulfo-3-methyl-phenyl with SO₃H | —H |

Formula 6 is described below

In the following, those described above for each group or substituent also apply.

L₁ represents an aromatic group which may be substituted or a heterocyclic group which may be substituted.

M₁ and M₂ each represents =CR₈— or —CR₉= or either one of M₁ and M₂ represents a nitrogen atom and the other represents =CR₈— or —CR₉=.

R₆ and R₇ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, where each group may further have a substituent.

Q₁, R₈ and R₉ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an arylsulfinyl group, a heterocyclic sulfinyl group, a sulfamoyl group, a sulfo group or a heterocyclic thio group, where each group may be further substituted.

R₈ and R₆, or R₆ and R₇ may combine to form a 5- or 6-membered ring.

Specific examples of the azo dye represented by formula 4 are set forth below, however, the azo dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion). As the counter ion, ammonium ion, organic cation and lithium ion are preferable, and lithium ion is more preferable.

TABLE 17

| L₁ | L₂ |
|---|---|
| (4-cyano-2-methylphenyl with SO₃H) | (pyridine core with CH₃, CN, two NH-phenyl-SO₃H substituents) |
| (3-cyano-4-methylphenyl-SO₃H) | (pyridine core with CH₃, CN, two NH-(methylphenyl-SO₃H) substituents) |
| (4-cyano-2-methylphenyl with SO₃H) | (pyridine core with CH₃, CN, two NH-(trimethylphenyl with SO₃H/OH) substituents) |
| (4-cyano-2-methylphenyl with SO₃H) | (pyridine core with CH₃, CN, two NH-(methylphenyl-SO₃H) substituents) |

TABLE 18

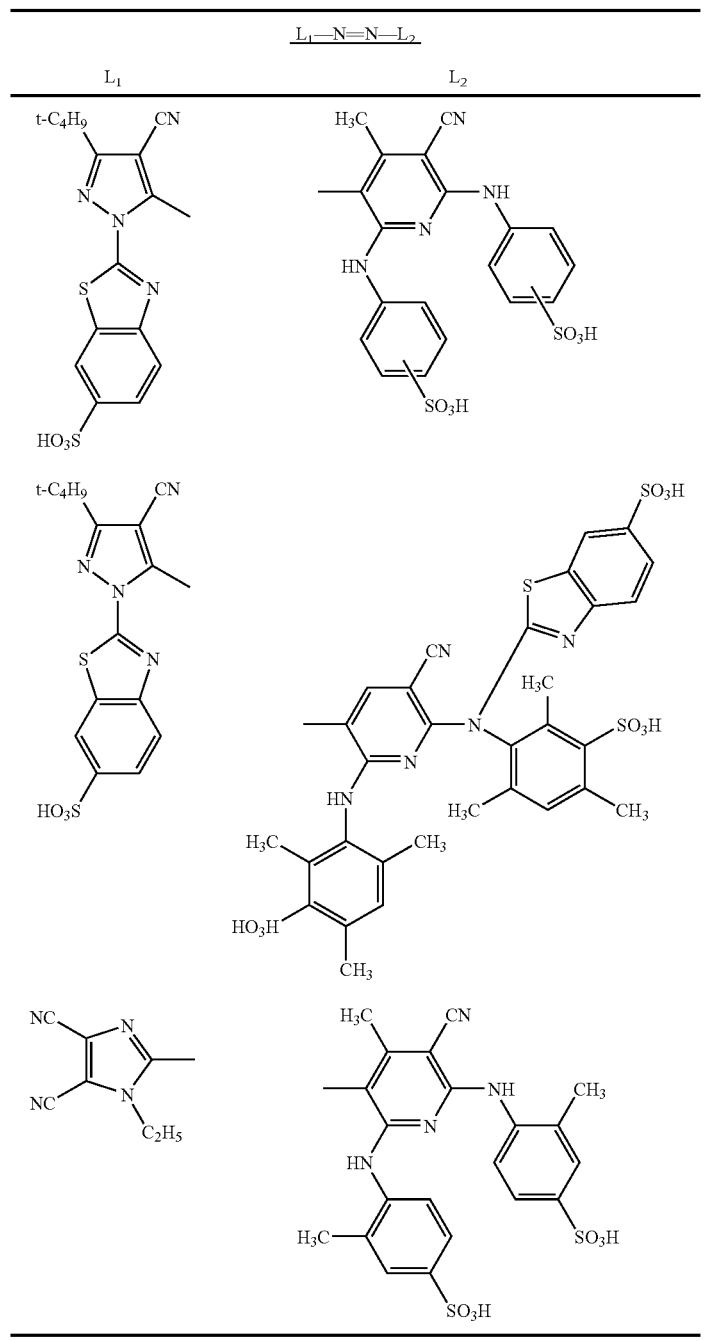

Formula 12 is described below.

In the following, those described above for each group or substituent also apply.

In formula 12, $X_1$, $X_2$, $X_3$ and $X_4$ each independently represents a group selected from the group consisting of —SO-Z, —SO$_2$-Z, —SO$_2$NR$_{18}$R$_{19}$ and a sulfo group.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_{18}$ and $R_{19}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a hydrogen atom, a substituted or unsubstituted alkyl group, a substituted or unsubstituted aryl group or a substituted or unsubstituted heterocyclic group, and most preferably a hydrogen atom, a substituted alkyl group, a substituted aryl group or a substituted heterocyclic group. However, $R_{18}$ and $R_{19}$ are not a hydrogen atom at the same time.

The heterocyclic group represented by $R_{18}$, $R_{19}$ and Z is preferably a 5- or 6-membered ring, where the ring may be further condensed with another ring. Also, the heterocyclic ring may be an aromatic heterocyclic ring or a non-aromatic heterocyclic ring. Examples of the heterocyclic group represented by $R_{18}$, $R_{18}$ and Z are shown below in the form of a heterocyclic ring by omitting the substitution site. The substitution site is not limited and for example, pyridine may be substituted at the 2-position, 3-position and 4-position.

Specific Examples of Heterocyclic Group

Pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent described later.

$Y_1$, $Y_2$, $Y_3$ and $Y_4$ each independently represents a hydrogen atom, or a monovalent substituent. Examples of the monovalent substituent represented by $Y_1$, $Y_2$, $Y_3$ and $Y_4$ include a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group and a sulfo group. These groups each may further have a substituent.

In particular, $Y_1$, $Y_2$, $Y_3$ and $Y_4$ each is preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

When Z, $R_{18}$, $R_{19}$, $Y_1$, $Y_2$, $Y_3$ and $Y_4$ each is a group which can further have a substituent, the group may further have the following substituent.

Specific Examples of Substituent

Specific examples of the substituent include a halogen atom (e.g., chlorine, bromine), a linear or branched alkyl group having from 1 to 12 carbon atoms, an aralkyl group having from 7 to 18 carbon atoms, an alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (examples of these groups include methyl, ethyl, propyl, isopropyl, tert-butyl, 2-methylsulfonylethyl, 3-phenoxypropyl, trifluoromethyl and cyclopentyl), an aryl group (e.g., phenyl, 4-tertbutylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methylsulfonylethoxy), an aryloxy group (e.g., phenoxy, 2-methylphenoxy, 4-tert-butylphenoxy, 3-nitrophenoxy, 3-tert-butyloxycarbonylphenoxy, 3-methoxycarbonylphenoxy), an acylamino group (e.g., acetamido, benzamido, 4-(3-tertbutyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methylsulfonyl, octylsulfonyl, phenylsulfonyl, 4-methylphenylsulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, quaternary ammonium).

The phthalocyanine dye represented by formula 12 is preferably a phthalocyanine dye having at least four or more ionic hydrophilic groups within one molecule, more preferably a phthalocyanine dye where the ionic hydrophilic group is a sulfo group or an carboxyl group, still more preferably a phthalocyanine dye having at least four or more sulfo groups and/or carboxyl groups.

$a_1$ to $a_4$ and $b_1$ to $b_4$ represent the number of substituents $X_1$ to $X_4$ and $Y_1$ to $Y_4$, respectively, and each independently represents an integer of 0 to 4. From the above-described definition, $a_1$ and $b_1$ each is independently an integer of 0 to 4 duly satisfying the relationship of $a_1+b_1=4$. However, the sum total of $a_1$ to $a_4$ is 2 or more. A combination where $a_1$ is 1 or 2 and $b_1$ is 3 or 2 is preferred, and a combination where $a_1$ is 1 and $b_1$ is 3 is mot preferred.

The same relationship as that between $a_1$ and $b_1$ is present in each of the pairs $a_2$ and $b_2$, $a_3$ and $b_3$, and $a_4$ and $b_4$, and the preferred combination is also the same.

M represents a hydrogen atom, a metal element, a metal oxide, a metal hydroxide or a metal halide.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl.

Among these, more preferred are Cu, Ni, Zn and Al, and most preferred is Cu.

Also, Pc (phthalocyanine ring) may form a dimer (for example, Pc-M-L-M-Pc) or a trimer through L (divalent linking group). At this time, Ms may be the same or different.

The divalent linking group represented by L is preferably an oxy group —O—, a thio group —S—, a carbonyl group —CO—, a sulfonyl group —$SO_2$—, an imino group —NH— or a methylene group —$CH_2$—.

In the phthalocyanine dye represented by formula 12, the following combination is particularly preferred.

$X_1$ to $X_4$ each independently represents preferably —$SO_2$-Z or —$SO_2NR_{18}R_{19}$.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_{18}$ and $R_{19}$ each independently represents preferably a hydrogen atom, a substituted or unsubstituted alkyl group, a substituted or unsubstituted aryl group or a substituted or unsubstituted heterocyclic group, and most preferably a hydrogen atom, a substituted alkyl group, a substituted aryl group or a substituted heterocyclic group.

$Y_1$ to $Y_4$ each independently represents preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_1$ to $a_4$ each independently represents preferably 1 or 2, more preferably 1. $b_1$ to $b_4$ each independently represents preferably 3 or 2, more preferably 3.

M represents a hydrogen atom, a metal element, a metal oxide, a metal hydroxide or a metal halide, more preferably Cu, Ni, Zn or Al, and most preferably Cu.

The phthalocyanine dye represented by formula 12 preferably contains an ionic hydroxyl group and a phthalocyanine dye having at least four or more ionic hydrophilic groups within one molecule is more preferred. In particular, the ionic hydrophilic group is preferably a sulfo group. A phthalocyanine dye having at least four or more sulfo groups is most preferred.

As for the preferred combination of groups in the compound represented by formula 12, a compound where at least one of various groups is the preferred group is preferred, a compound where a larger number of various groups are the preferred groups is more preferred, and a compound where all groups are the preferred groups is most preferred.

Specific examples of the phthalocyanine dye represented by formula 12 are set forth below, however, the phthalocyanine dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion). As the counter ion, ammonium ion, organic cation and lithium ion are preferable, and lithium ion is more preferable.

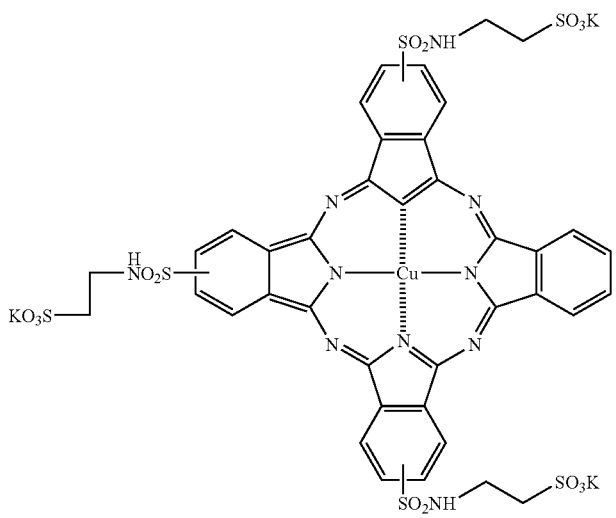

12-1

12-2
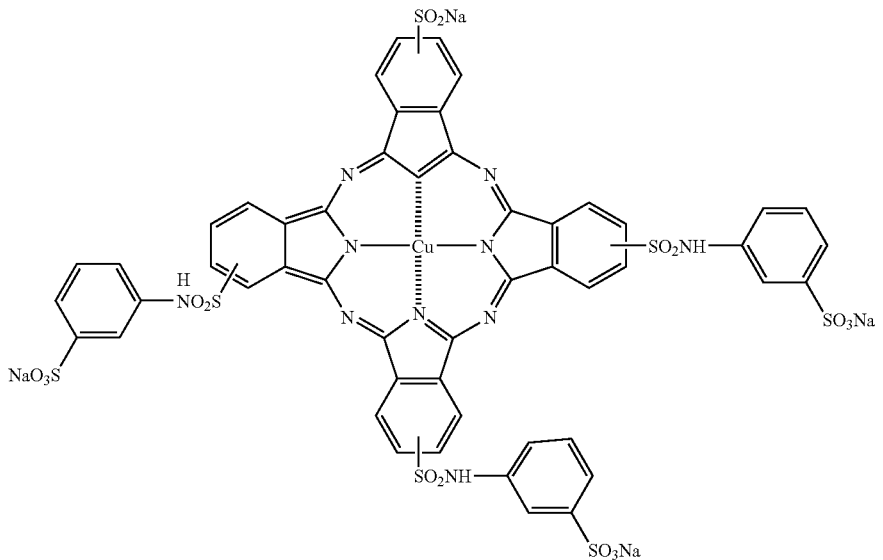
12-3
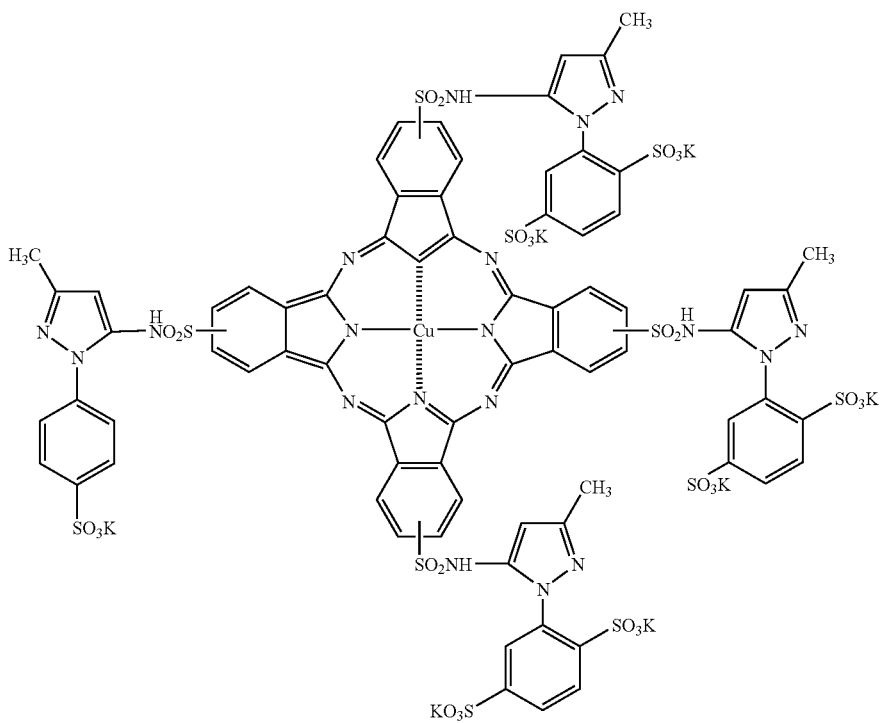

12-4
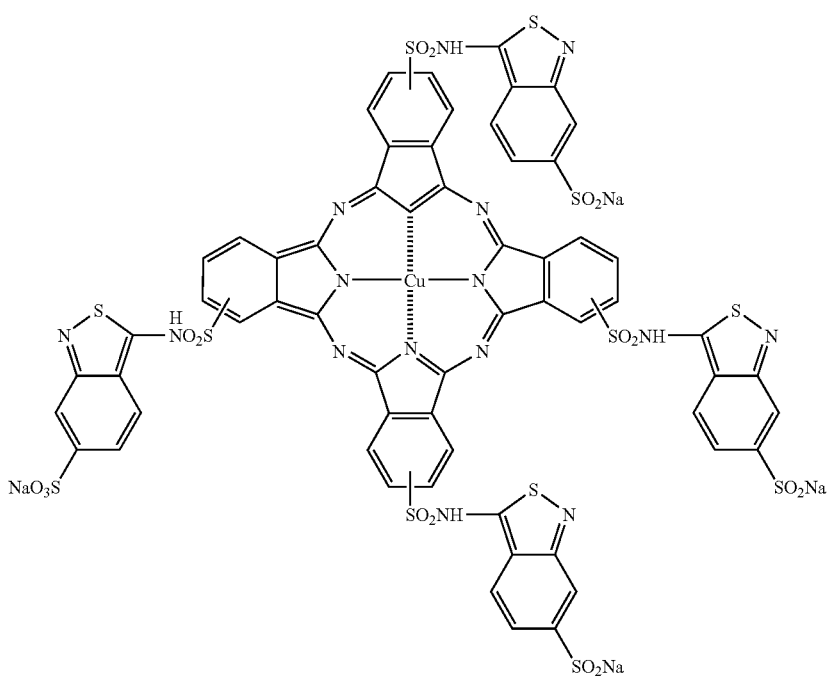
12-5
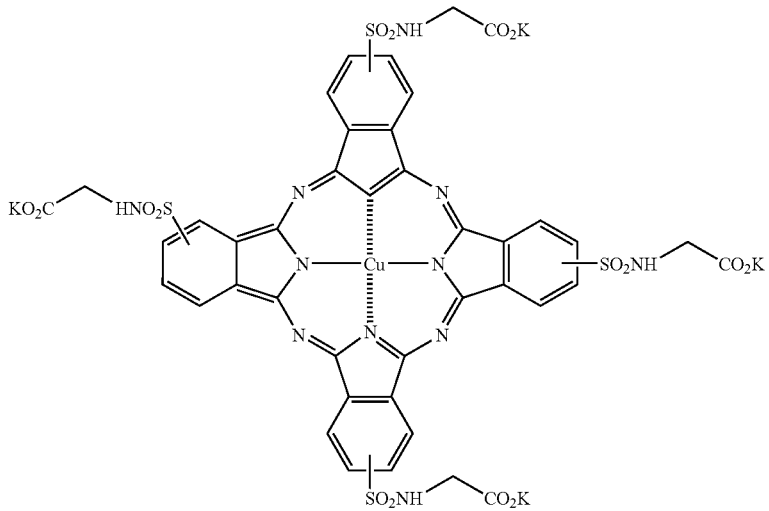

12-6
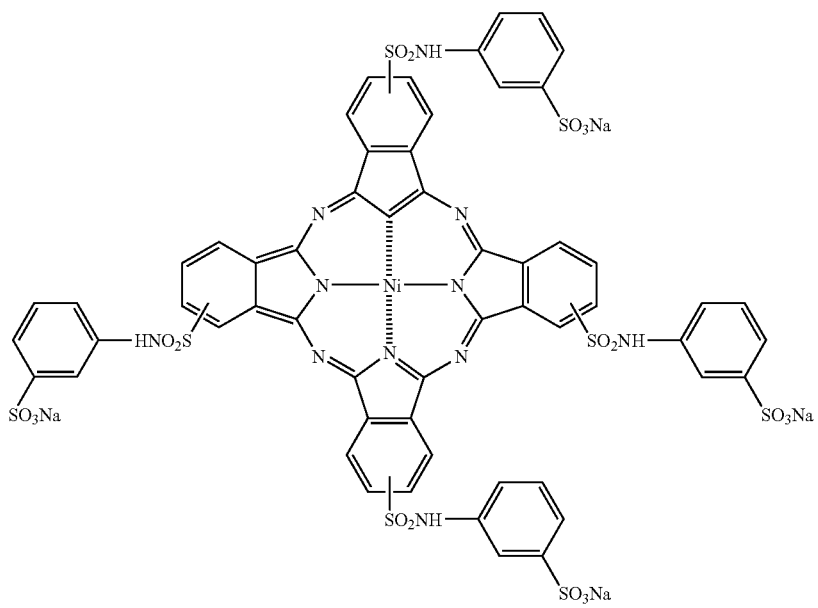
12-7
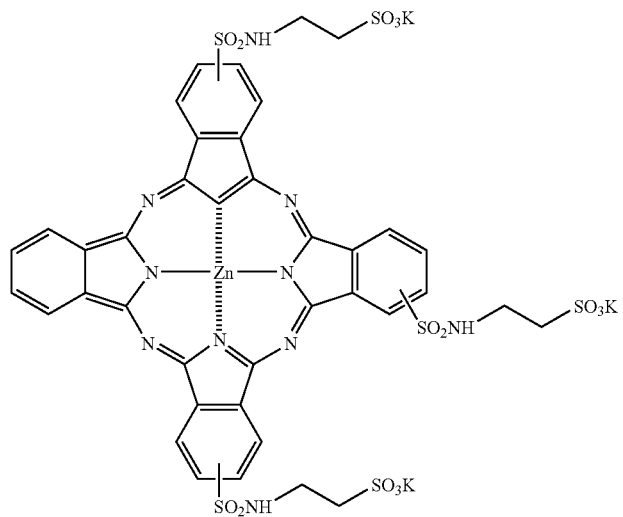

Formula 13 is described below.

In the following, those described above for each group or substituent also apply.

In formula 13, $X_{11}$ to $X_{14}$ and $Y_{11}$ to $Y_{18}$ have the same meanings as $X_1$ to $X_4$ and $Y_1$ to $Y_4$, respectively, and preferred examples are also the same. M has the same meaning as M in formula 12 and preferred examples are also the same.

In formula 13, $a_{11}$ to $a_{14}$ each independently represents an integer of 1 or 2 and preferably satisfies $4 \leq a_{11}+a_{12}+a_{13}+a_{14} \leq 6$. In particular, $a_{11}=a_{12}=a_{13}=a_{14}=1$ is preferred.

In the phthalocyanine dye represented by formula 13, the following combination of substituents is particularly preferred.

$X_1$ to $X_4$ each independently represents preferably —$SO_2$-Z or —$SO_2NR_{18}R_{19}$.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_{18}$ and $R_{19}$ each independently represents preferably a hydrogen atom, a substituted or unsubstituted alkyl group, a substituted or unsubstituted aryl group or a substituted or unsubstituted heterocyclic group, and most preferably a hydrogen atom, a substituted alkyl group, a substituted aryl group or a substituted heterocyclic group. However, $R_{18}$ and $R_{19}$ are a hydrogen atom at the same time.

$Y_{11}$ to $Y_{18}$ each preferably represents a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represents preferably 1 or 2 and it is particularly preferred that all are 1.

M represents a hydrogen atom, a metal element, a metal oxide, a metal hydroxide or a metal halide, more preferably Cu, Ni, Zn or Al, and most preferably Cu.

In the case where the phthalocyanine dye represented by formula 13 contains an ionic hydrophilic group, a phthalocyanine dye having at least four or more ionic hydrophilic groups within one molecule is more preferred. Examples of the ionic hydrophilic group as the substituent include a sulfo group, a phosphono group, a carboxyl group and a quaternary ammonium. The carboxyl group and the sulfo group each may be in the form of a salt and examples of the counter ion for forming the salt include alkali metal ion (e.g., lithium ion, sodium ion, potassium ion) and organic cation (e.g., tetramethylammonium ion). The ionic hydrophilic group as the substituent is preferably a sulfo group or a carboxyl group, and most preferably a sulfo group.

As for the preferred combination of groups in the compound represented by formula 13, a compound where at least one of various groups is the preferred group is preferred, a compound where a larger number of various groups are the preferred groups is more preferred, and a compound where all groups are the preferred groups is most preferred.

Also, at least one electron-withdrawing group such as sulfinyl group, sulfonyl group or sulfamoyl group is preferably introduced into respective benzene rings of phthalocyanine such that the total of σp values becomes 1.6 or more.

Specific examples of the phthalocyanine dye represented by formula 13 (including superordinate concept formula 12) are set forth below, however, the phthalocyanine dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium ion). As the counter ion, ammonium ion, organic cation and lithium ion are preferable, and lithium ion is more preferable.

TABLE 19

[Phthalocyanine structure with $(X)_a$ substituents on four benzene rings, central M atom coordinated by four N atoms, with H substituents shown]

| No. | M | X | a |
|-----|---|---|---|
| 12-8 | Cu | —$SO_2NH$—[phenyl]—$NHCO$—[phenyl]—$SO_3Na$ | 1 |
| 12-9 | Cu | —$SO_2N(CH_3)$—[phenyl]—$SO_3Na$ | 1 |
| 12-10 | Cu | —$SO_2NH$—[CH$_2$CH$_2$]—$SO_3K$ | 1 |
| 12-11 | Cu | —$SO_2NH$—[propyl]—N([CH$_2$CH$_2$OH]$_2$)·HCl | 1 |
| 12-11 | Cu | —$SO_2NHCH_2CO_2Na$ | 1 |
| 12-13 | Cu | —$SO_2NH$—[phenyl with two $CO_2Na$ groups] | 1 |
| 12-14 | Cu | —$SO_2NH$—[CH$_2$CH$_2$]—$CO_2K$ | 1 |

TABLE 19-continued
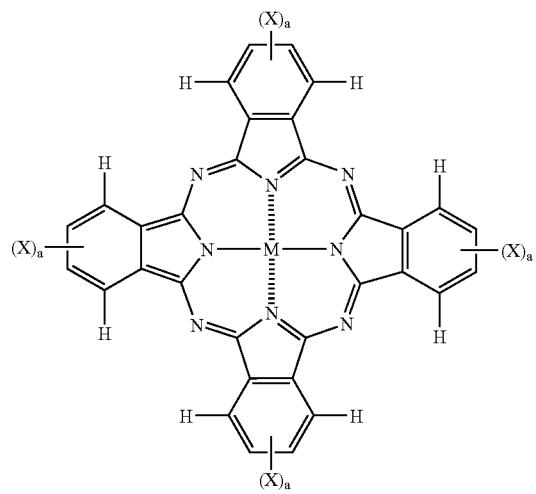
| No. | M | X | a |
|---|---|---|---|
| 12-15 | Cu | —SO₂N(piperidine-3-CO₂Na) | 1 |
TABLE 20
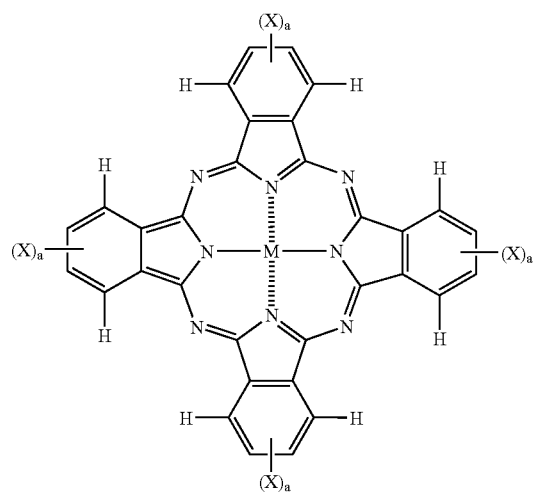
| No. | M | X | a |
|---|---|---|---|
| 12-16 | Cu | —SO₂-(benzothiazol-2-yl)-6-SO₃K | 1 |
| 12-17 | Cu | —SO₂(CH₂)₃SO₃Na | 2 |
| 12-18 | Zn | —SO₂NH-C₆H₄-3-SO₃Na | 1 |
TABLE 20-continued
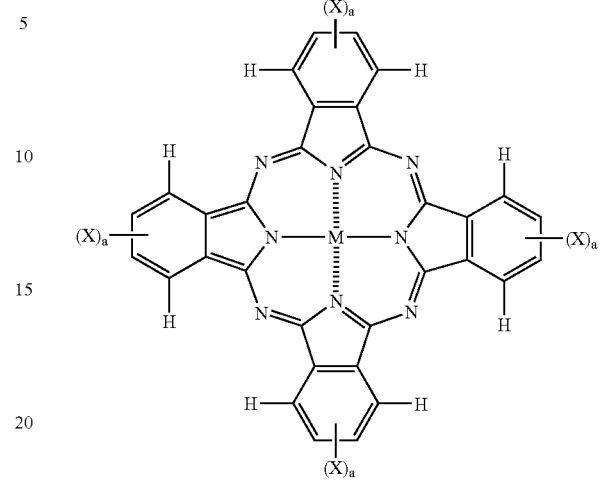
| No. | M | X | a |
|---|---|---|---|
| 12-19 | Zn | —SO₂NH-(benzisothiazol-3-yl)-6-SO₃K | 1 |
| 12-20 | Zn | —SO₂(CH₂)₃SO₃K | 1 |
| 12-21 | Ni | —SO₂N(Et)-C₆H₄-3-SO₃Na | 1 |
| 12-22 | Ni | —SO₂NH-(3-methyl-1-(2,5-di-SO₃K-phenyl)pyrazol-5-yl) | 1 |
| 12-23 | Ni | —SO₂(CH₂)₃SO₃Na | 1 |

TABLE 21

| No. | M | X | a |
|---|---|---|---|
| 12-24 | Cu | —SO₂NH- (3-methyl-1-(2,5-disulfonatophenyl)pyrazol-5-yl) | 1 |
| 12-25 | Cu | —SO₂NH- (6-sulfonato-benzisothiazol-3-yl, SO₃K) | 1 |
| 12-26 | Cu | —SO₂NH- (1,2,4-thiadiazol-5-yl)-3-S-CH₂CH₂SO₃Na | 1 |
| 12-27 | Cu | —SO₂NH- (6-SO₃Na-benzothiazol-2-yl) | 1 |
| 12-28 | Cu | —SO₂N(CH₂CO₂Na)₂ | 1 |
| 12-29 | Cu | —SO₂-CH₂CH₂CH₂-SO₃Na | 1 |
| 12-30 | Cu | —SO₂-(C₆H₄)-O-(CH₂)₄-SO₃K | 1 |

TABLE 21-continued
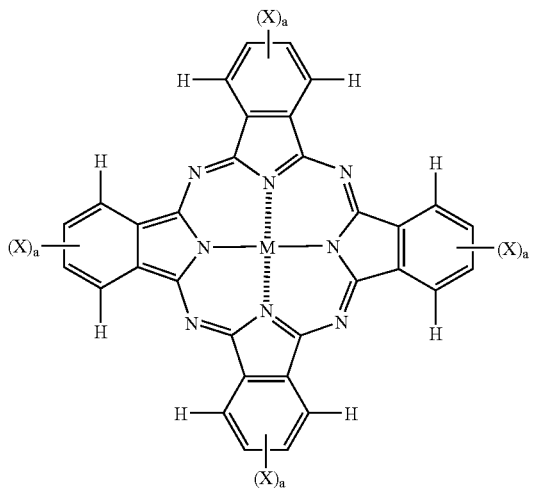
| No. | M | X | a |
|---|---|---|---|
| 12-31 | Cu | —SO$_2$—(C$_6$H$_4$)—CO$_2$Na (ortho) | 1 |
TABLE 22
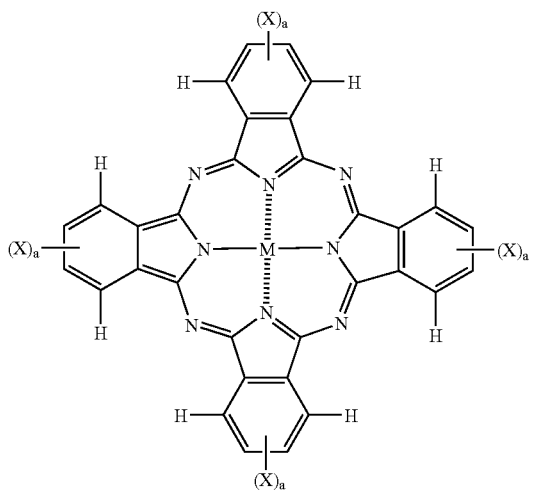
| No. | M | X | a |
|---|---|---|---|
| 12-32 | Cu | —SO$_2$—(CH$_2$)$_3$—NHCO—(C$_6$H$_3$)(CO$_2$K)(CO$_2$K) | 1 |

TABLE 22-continued
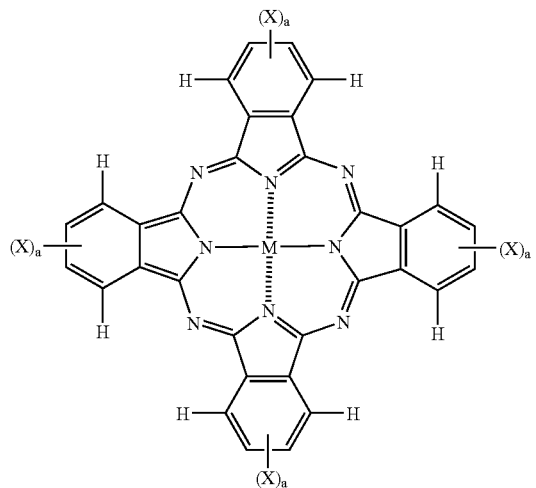
| No. | M | X | a |
|---|---|---|---|
| 12-33 | Cu | 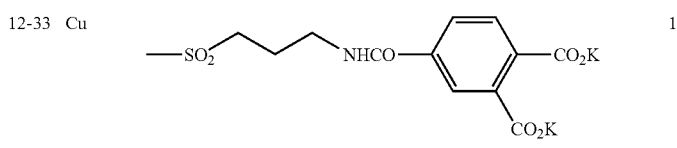 | 1 |
| 12-34 | Cu | 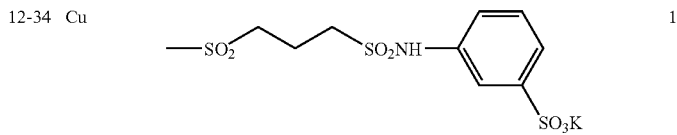 | 1 |
| 12-35 | Cu | 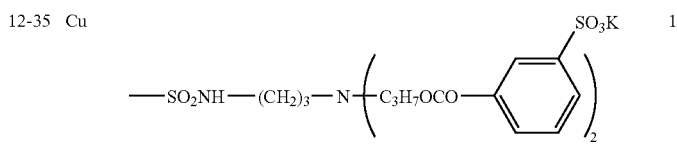 | 1 |
| 12-36 | Cu | 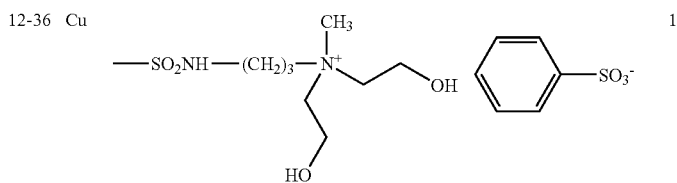 | 1 |

In the following Tables, specific examples of each pair of $(Y_{11}, Y_{12})$, $(Y_{12}, Y_{14})$, $(Y_{15}, Y_{16})$ and $(Y_{17}, Y_{18})$ are independently in an irregular order.

TABLE 23

[Phthalocyanine structure with central metal M, substituents $(X)_a$ on four benzene rings, and $Y_{11}$ through $Y_{18}$ positions]

| No. | M | X | $Y_{11}, Y_{12}$ | $Y_{12}, Y_{14}$ | $Y_{15}, Y_{16}$ | $Y_{17}, Y_{18}$ | a |
|---|---|---|---|---|---|---|---|
| 12-37 | Cu | —SO$_2$NH—[phenyl]—NHSO$_2$—[phenyl]—SO$_3$K | H, Cl | H, Cl | H, Cl | H, Cl | 1 |
| 12-38 | Cu | —SO$_2$N(CH$_2$CH$_2$OEt)$_2$ | H, Cl | H, Cl | H, Cl | H, Cl | 1 |
| 12-39 | Cu | —SO$_2$—(CH$_2$)$_3$—SO$_3$K | H, Cl | H, Cl | H, Cl | H, Cl | 1 |
| 12-40 | Cu | —SO$_2$—[phenyl]—O—(CH$_2$)$_4$—SO$_3$Li | Cl, Cl | Cl, Cl | Cl, Cl | Cl, Cl | 1 |
| 12-41 | Cu | —SO$_2$—[phenyl]—CO$_2$K | H, Cl | H, Cl | H, Cl | H, Cl | 1 |

The inkjet recording ink can be produced by dissolving and/or dispersing the above-described azo dye in a lipophilic or aqueous medium. An ink using an aqueous medium is preferred. If desired, other additives are added within the range of not impairing the effect of the present invention. Examples of other additives include known additives such as drying inhibitor (wetting agent), discoloration inhibitor, emulsification stabilizer, permeation accelerator, ultraviolet absorbent, antiseptic, fungicide, pH adjusting agent, surface tension adjusting agent, defoaming agent, viscosity adjusting agent, dispersant, dispersion stabilizer, rust inhibitor and chelating agent.

These various additives are directly added to the ink solution in the case of a water-soluble ink. When an oil-soluble dye is used in the form of a dispersion, the additives are generally added to the dispersion after the preparation of a dye dispersion but may be added to the oil or aqueous phase at the preparation.

The drying inhibitor is suitably used for the purpose of preventing occurrence of clogging due to drying of the inkjet ink at the ink jetting port of a nozzle used for the inkjet recording system.

The drying inhibitor is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 wt %.

The permeation accelerator is suitably used for the purpose of obtaining higher permeation of the inkjet ink into paper. Examples of the permeation accelerator which can be used include alcohols (e.g., ethanol, isopropanol, butanol, di(tri)ethylene glycol monobutyl ether, 1,2-hexanediol), sodium laurylsulfate, sodium oleate and nonionic surfactants. A sufficiently high effect can be obtained by adding from 5 to 30 wt % of the permeation accelerator to the ink. The permeation accelerator is preferably used in an amount within the range of causing no blurring of printed letter or no print through.

The ultraviolet absorbent is used for the purpose of improving the preservability of image. Examples of the ultraviolet absorbent which can be used include benzotriazole-base compounds described, for example, in JP-A-58-185677 (the term "JP-A" as used herein means an "unexamined published Japanese patent application"), JP-A-61-190537, JP-A-2-782, JP-A-5-197075 and JP-A-9-34057, benzophenone-base compounds described, for example, in JP-A-46-2784, JP-A-5-194483 and U.S. Pat. No. 3,214,463, cinnamic acid-base compounds described, for example, in JP-B-48-30492 (the term "JP-B" as used herein means an "examined Japanese patent publication"), JP-B-56-21141 and JP-A-10-88106, triazine-base compounds described, for example, in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in Research Disclosure No. 24239, and compounds of absorbing ultraviolet light and emitting fluorescent light, so-called fluorescent brightening agents, represented by stilbene-base compound and benzoxazole-base compound.

The discoloration inhibitor is used for the purpose of improving the preservability of image. Examples of the discoloration inhibitor which can be used include various organic discoloration inhibitors and metal complex-base discoloration inhibitors. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in Research Disclosure, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydroacetate, sodium benzoate, sodium pyridinethione-1-oxide, ethyl p-hydroxybenzoate, 1,2-benzisothiazolin-3-one and salts thereof. The fungicide is preferably used in the ink in an amount of 0.02 to 1.00 wt %.

As the pH adjusting agent, a neutralizer (e.g., organic base, inorganic alkali) can be used. The pH adjusting agent is used for the purpose of improving the storage stability of the inkjet recording ink and is preferably added to adjust the inkjet recording ink to a pH of 6 to 10, more preferably from 7 to 10.

The surface tension adjusting agent includes nonionic, cationic and anionic surfactants. Here, the surface tension of the inkjet ink of the present invention is preferably from 20 to 60 mN/m, more preferably from 25 to 45 mN/m. Also, the viscosity of the inkjet recording ink of the present invention is preferably 30 mPa.s or less, more preferably from 1 to 20 mPa.s.

Preferred examples of the surfactant include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene-alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. In addition, amine oxide-type amphoteric surfactants such as N,N-dimethyl-N-alkylamine oxide are preferred. Furthermore, surfactants described in JP-A-59-157636 (pages (37) to (38)) and Research Disclosure, No. 308119 (1989) can be used.

A defoaming agent such as chelating agent represented by fluorine- or silicon-containing compounds and EDTA can also be used, if desired.

As the aqueous medium, a mixture comprising water as the main component and a water-miscible organic solvent added, if desired, can be used. Examples of the water-miscible organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

The dye for use in the present invention is preferably contained in an amount of 0.2 to 30 parts by weight (total of all dyes of formulae 1 to 13 and 15) per 100 parts by weight of the inkjet recording ink of the present invention. Furthermore, in the inkjet recording ink of the present invention, another coloring agent may be used in combination with the dye described above. In the case of using another coloring agent in combination, the total content of coloring agents is preferably in the above-described range.

In use as an inkjet recording ink, the ratio of dye represented by formula 1/other dye used is preferably from 10/1 to 1/1 (by weight), more preferably from 5/1 to 1/1 (by weight).

The inkjet recording ink containing the coloring material of the present invention can be used for the formation of a monochromatic (preferably black) image or a full color image. For forming a full color image, a magenta color tone ink, a cyan color tone ink and a yellow color tone ink can be used in addition to the black ink of the present invention.

For the above-described another coloring agent or for the magenta, cyan and yellow color tone inks, for example, the following dyes or known pigments can be used.

As the yellow dye, an arbitrary yellow dye can be used. Examples thereof include aryl- or heteryl-azo dyes having a phenol, a naphthol, an aniline, a heterocyclic ring (e.g., pyrazolone, pyridone), an open chain-type active methylene compound or the like as the coupling component (hereinafter referred to as a "coupler component"); azomethine dyes having an open chain-type active methylene compound or the like as the coupler component; methine dyes such as benzylidene dye and monomethine oxonol dye; and quinone-base dyes such as naphthoquinone dye and anthraquinone dye. Other examples of the dye species include quinophthalone dye, nitro.nitroso dye, acridine dye and acridinone dye.

As the magenta dye, an arbitrary magenta dye can be used. Examples thereof include aryl- or heteryl-azo dyes having a phenol, a naphthol, an aniline, a heterocyclic ring (e.g., pyrazine), an open chain-type active methylene compound or the like as the coupling component (hereinafter referred to as a "coupler component"); azomethine dyes having an open chain-type active methylene compound or the like as the coupler component; and anthrapyridone dyes.

As the cyan dye, an arbitrary cyan dye can be used. Examples thereof include aryl- or heteryl-azo dyes having a phenol, a naphthol or an aniline as the coupler component; azomethine dyes having a phenol, a naphthol or a heterocyclic ring (e.g., pyrrolotriazole) as the coupler component; polymethine dyes such as cyanine dye, oxonol dye and merocyanine dye; carbonium dyes such as diphenylmethane dye, triphenylmethane dye and xanthene dye; phthalocyanine dyes; anthraquinone dyes; and indigo.thioindigo dyes.

These dyes may be a dye which provides a yellow or cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

[Inkjet Recording Method]

In the inkjet recording method of the present invention, an energy is provided to the inkjet recording ink and thereby an image is formed on a known image-receiving material, namely, plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like.

At the formation of an image, a polymer latex compound may be used in combination for the purpose of giving glossiness or water resistance or improving the weather resistance. The timing of imparting the latex compound to the image-receiving material may be before, after or simultaneous with the addition of the coloring agent. Accordingly, the site to which the polymer latex is added may be in the image-receiving paper or ink or a liquid material composed of the polymer latex alone may be prepared and used. More specifically, the methods described in JP-A-2002-166638, JP-A-2002-121440, JP-A-2002-154201, JP-A-2002-144696, JP-A-2002-080859, 2000-299465 and 2000-297365 can be preferably used.

The recording paper and recording film which are used in the inkjet printing performed using the ink of the present invention are described below.

The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP by mixing, if desired, additives such as conventionally known pigment, binder, sizing agent, fixing agent, cation agent and paper strength increasing agent and then sheeting the mixture using various devices such as Fourdrinier paper machine and cylinder paper machine. Other than this support, synthetic paper or plastic film sheet may be used. Th thickness of the support is preferably from 10 to 250 μm and the basis weight is preferably from 10 to 250 g/m$^2$. An ink-accepting layer and a backcoat layer may be provided on the support as it is, or a size press or anchor coat layer is provided using starch, polyvinyl alcohol or the like and then an ink-accepting layer and a backcoat layer may be provided. The support may be further subjected to a flattening treatment by a calendering device such as machine calender, TG calender and soft calender. The support for use in the present invention is preferably paper or plastic film of which both surfaces are laminated with polyolefin (for example, polyethylene, polystyrene, polyethylene terephthalate, polybutene or a copolymer thereof). In the polyolefin, a white pigment (for example, titanium oxide or zinc oxide) or a tinting dye (for example, cobalt blue, ultramarine or neodymium oxide) is preferably added.

The ink-accepting layer provided on the support contains a pigment and an aqueous binder. The pigment is preferably a white pigment. Examples of the white pigment include inorganic white pigments (particle) such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. The inorganic white pigment (particle) contained in the ink-accepting layer is preferably a porous inorganic pigment, more preferably a synthetic amorphous silica or the like having a large pore area. The synthetic amorphous silica may be either a silicic acid anhydride obtained by a dry production method or a silicic acid hydrate obtained by a wet production method but is preferably a silicic acid hydrate.

Examples of the aqueous binder contained in the ink-accepting layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene-butadiene copolymer latex and acryl emulsion. These aqueous binders can be used individually or in combination of two or more thereof. Among these, polyvinyl alcohol and silanol-modified polyvinyl alcohol are preferred in the present invention in view of attaching property to the pigment and peeling resistance of the ink-accepting layer.

The ink-accepting layer may contain a mordant, a water-proofing agent, a light fastness enhancer, a surfactant and other additives in addition to the pigment and the aqueous binder.

The mordant added to the ink-accepting layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for forming a water-resistant image. The water-proofing agent is preferably a cationic resin. Examples of the cationic resin include polyamidopolyamine epichlorohydrin, polyethyleneimine, polyaminesulfone, poly-dimethyldiallyl-ammonium chloride, cation polyacrylamide and colloidal silica. Among these cationic resins, polyamidopolyamine epichlorohydrin is preferred. The cationic resin content is preferably from 1 to 15 wt %, more preferably from 3 to 10 wt %, based on the entire solid content of the ink-accepting layer.

Examples of the light fastness enhancer include zinc sulfate, zinc oxide, hindered amine-base antioxidants and benzotriazole-base ultraviolet absorbents such as benzophenone. Among these, zinc sulfate is preferred.

The surfactant functions as a coating aid, a releasability improver, a slipperiness improver or an antistatic agent. The surfactant is described in JP-A-62-173463 and JP-A-62-183457. In place of the surfactant, an organic fluoro compound may be used. The organic fluoro compound is preferably hydrophobic. Examples of the organic fluoro compound include a fluorine-containing surfactant, an oily fluorine-base compound (for example, fluorine oil) and a solid fluorine compound resin (for example, ethylene tetrafluoride resin). The organic fluoro compound is described in JP-B-57-9053 (columns 8 to 17), JP-A-61-20994 and JP-A-62-135826. Other examples of the additive added to the ink-accepting layer include a pigment dispersant, a thickener, a defoaming agent, a dye, a fluorescent brightening agent, an antiseptic, a pH adjusting agent, a matting agent and a hardening agent. The ink-accepting layer may be composed of either one layer or two layers.

In the recording paper or film, a backcoat layer may also be provided. Examples of the component which can be added to this layer include a white pigment, an aqueous binder and other components. Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

A polymer latex may be added to a constituent layer (including the backcoat layer) of the inkjet recording paper or film. The polymer latex is used for the purpose of improving film properties, for example, stabilizing the dimension and preventing the curling, adhesion or film cracking. The polymer latex is described in JP-A-62-245258, JP-A-62-1316648 and JP-A-62-110066. When a polymer latex having a low glass transition temperature (40° C. or less) is added to a layer containing a mordant, the layer can be prevented from cracking or curling. The curling can also be prevented by adding a polymer latex having a high glass transition temperature to the backcoat layer.

The ink of the present invention is not limited in the inkjet recording system and is used for a known system, for example, a charge controlling system of jetting out the ink by using the electrostatic induction force, a drop-on-demand system (pressure pulse system) of using a vibration pressure of a piezoelectric element, an acoustic inkjet system of converting electric signals into acoustic beams, irradiating the beams on the ink and jetting out the ink by using the radiation pressure, and a thermal inkjet system of heating the ink to form a bubble and utilizing the generated pressure. The inkjet recording system includes a system of ejecting a large number of small-volume ink droplets of so-called photo-ink having a low concentration, a system of improving the image quality by using a plurality of inks having substantially the same color hue but differing in the concentration, and a system of using a colorless transparent ink.

EXAMPLES

The present invention is described in greater detail below by referring to Examples, however, the present invention is not limited to these Examples.

Example 1

Deionized water was added to the following components to make 20 ml and the resulting solution was stirred for 1 hour under heating at 30 to 40° C. Thereafter, the solution was adjusted to a pH of 9 with 10 mol/L of KOH and then filtered under pressure through a microfilter having an average pore size of 0.25 μm to prepare Dye Ink Solutions A and B.

Composition of Ink Solution A:

| | |
|---|---|
| Dye (b-7) of the present invention | 2 g |
| Dye (h-1) | 1 g |

-continued

| | |
|---|---|
| Diethylene glycol | 0.15 g |
| Glycerin | 2.25 g |
| Diethylene glycol monobutyl ether | 1.48 g |
| 2-Pyrrolidone | 0.73 g |
| Triethanolamine | 0.25 g |
| benzotriazole | 0.06 g |
| Olfine E1010 | 0.15 g |
| PROXEL XL2 | 0.05 g |

Composition of Ink Solution B:

| | |
|---|---|
| Dye (b-7) of the present invention | 2 g |
| Dye (h-1) | 0.80 g |
| Dye (h-2) | 0.80 g |
| Diethylene glycol | 0.15 g |
| Glycerin | 2.25 g |
| Diethylene glycol monobutyl ether | 1.48 g |
| 2-Pyrrolidone | 0.73 g |
| Triethanolamine | 0.25 g |
| Benzotriazole | 0.06 g |
| Olfine E1010 | 0.15 g |
| PROXEL XL2 | 0.05 g |

As the ink solution for comparison, Ink Solutions 101 to 103 were prepared using Comparative Dyes 1 to 3 as shown in Table 19.

In the case of changing the dye, the dye was used such that the amount added thereof became equimolar to the dye used in Ink Solution A (in the case of Comparative Dyes 1 to 3, equimolar to b-7 and in the case of h-2 of Inks 101 to 103, equimolar to h-1 of Ink A).

(Recording and Evaluation of Image)

Inkjet inks prepared above by using each of Ink Solutions A and B and comparative ink solutions were subjected to the following evaluations. The results obtained are shown in Table 19.

In Table 19, the "paper dependency", "water resistance", "light fastness", "dark heat preservability" and "ozone gas resistance" were evaluated by the following methods after an image was recorded on a photo gloss paper (PM Photographic Paper "KOTAKU" (KA420PSK, EPSON), produced by Seiko Epson Corp.) in an inkjet printer (PM-700C, manufactured by Seiko Epson Corp.) by using each inkjet ink.

<Paper Dependency>

The image formed on the above-described photo gloss paper and the image separately formed on plain paper for PPC were compared on the color tone. The evaluation was performed by the two-stage rating, that is, A (good) when the difference between two images was small, and B (bad) when the difference between two images was large.

<Water Resistance>

The photo gloss paper having formed thereon an image was dried at room temperature for 1 hour, dipped in deionized water for 10 seconds and then naturally dried at room temperature. The bleeding was observed and evaluated by the three-stage rating, that is, A when bleeding was not observed, B when bleeding was slightly generated and C when bleeding was seriously generated.

<Light Fastness>

On the photo gloss paper having formed thereon an image, xenon light (85,000 lx) was irradiated for 7 days using a weather meter (Atlas C. I65). The image density before and after the xenon irradiation was measured by a reflection densitometer (X-Rite 310TR) and evaluated as the dye residual percentage. The reflection density was measured at three points of 1, 1.5 and 2.0.

The light fastness was evaluated by the three-stage rating, that is, A when the dye residual percentage was 70% or more at all densities, B when less than 70% at one or two points, and C when less than 70% at all densities.

<Dark Heat Preservability>

The photo gloss paper having formed thereon an image was stored for 7 days under the conditions of 80° C. and 15% RH. The image density before and after the storage was measured by a reflection densitometer (X-Rite 310TR) and evaluated as the dye residual percentage. The dye residual percentage was evaluated at three points having a reflection density of 1, 1.5 and 2.0. The rating was A when the dye residual percentage was 90% or more at all densities, B when less than 90% at one or two points, and C when less than 90% at all densities.

<Ozone Resistance>

In a box set to an ozone gas concentration of 0.5 to 0.1 ppm, room temperature and dark place, the photo gloss paper having formed thereon an image was left standing for 7 days. The image density before and after standing in the ozone gas atmosphere was measured by a reflection densitometer (X-Rite 310TR) and evaluated as the dye residual percentage. The reflection density was measured at three points of 1, 1.5 and 2.0. The ozone gas concentration in the box was set by using an ozone gas monitor (Model OZG-EM-01) manufactured by APPLICS.

The evaluation was performed by the three-stage rating, namely, A when the dye residual percentage was 70% or more at all densities, B when less than 70% at one or two points, and C when less than 70% at all densities. Table 19

TABLE 19

| Ink | Dye | Paper Dependency | Water Resistance | Light Fastness | Dark Heat Preservability | Zone Resistance |
|---|---|---|---|---|---|---|
| A | b-7, h-1 | A | A | A | A | A |
| B | b-7, h-1, h-2 | A | A | A | A | A |
| 101 | Comparative Dye 1, h-2 | A | A | B | A | C |
| 102 | Comparative Dye 2, h-2 | A | A | B | A | C |
| 103 | Comparative Dye 3, h-2 | A | A | B | A | C |

Comparative Dye 1:

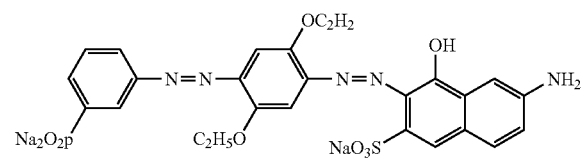

Comparative Dye 2:

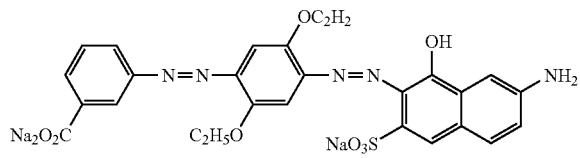

Comparative Dye 3:

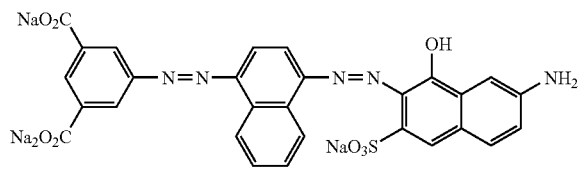

As seen from Table 19, the images obtained by using Ink Solutions A and B of the present invention were excellent in light fastness and ozone (gas) resistance.

Separately, an image was recorded using Ink Solution A or B on a superfine special gloss paper (MFA4S3P, produced by Seiko Epson Corp.) in an inkjet printer (PM-700C, manufactured by Seiko Epson Corp.). The color hue and light fastness of the obtained images were evaluated. Then, the same results as in Table 19 were obtained in both images.

Example 2

Using the same ink as produced in Example 1, an image was printed on Inkjet Photo Gloss Paper EX produced by Fuji Photo Film Co., Ltd. by means of the same printer as used in Example 1 and evaluated in the same manner as in Example 1. Then, the same results as in Example 1 were obtained.

Example 3

The same ink as produced in Example 1 was filled in a cartridge of Inkjet Printer BJ-F850 (manufactured by Canon Inc.) and using this printer, an image was printed on Photo Gloss Paper GP-301 produced by the same company and evaluated in the same manner as in Example 1. Then, the water-soluble ink of the present invention could give a color image or colored material excellent in the color hue and fastness and the same results as in Example 1 were obtained.

According to the inkjet recording ink and inkjet recording method using the aqueous ink of the present invention, an image having good color hue and at the same time, having high fastness to light and active gases in the environment, particularly ozone gas, can be formed.

This application is based on Japanese patent applications JP 2003-002408 (filed on Jan. 8, 2003) and JP 2003-360370 (filed on Oct. 21, 2003), the entire content of which is hereby incorporated by reference, the same as if set forth at length.

What is claimed is:

1. A coloring composition comprising a dye represented by the following formula 1 and at least one dye selected from the dyes represented by the following formulae 2 to 6:

$$A_1\text{-}N{=}N\text{-}A_2\text{-}N{=}N\text{-}A_3 \quad \text{Formula 1:}$$

Formula 2:

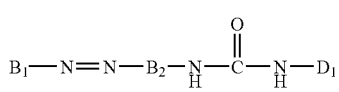

Formula 3:

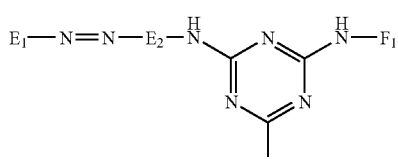

Formula 4:

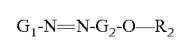

Formula 5:

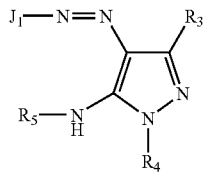

Formula 6:

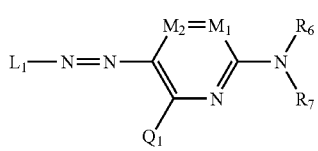

wherein in formula 1, $A_1$, $A_2$ and $A_3$ each independently represents an aromatic group which may be substituted, or a heterocyclic group which may be substituted, and $A_1$ and $A_3$ each is a monovalent group and $A_2$ is a divalent group, wherein at least one of $A_1$, $A_2$ and $A_3$ is an aromatic heterocyclic group;

in formula 2, $B_1$ and $B_2$ each independently represents an aromatic group which may be substituted, or a heterocyclic group which may be substituted, and $D_1$ represents an arbitrary substituent;

in formula 3, $E_1$ and $E_2$ each independently represents an aromatic group which may be substituted or a heterocyclic group which may be substituted, $E_1$ is a monovalent group and $E_2$ is a divalent group, $F_1$ represents an arbitrary substituent, and $R_1$ represents a monovalent group;

in formula 4, $G_1$ and $G_2$ each independently represents an aromatic group which may be substituted, or a heterocyclic group which may be substituted, and $R_2$ represents an arbitrary substituent except for hydrogen;

in formula 5, $R_3$ and $R_5$ each independently represents a hydrogen atom, an alkyl group, a cycloalkyl group, an aralkyl group, an alkoxy group or an aryl group, $R_4$ represents a hydrogen atom, an alkyl group, a cycloalkyl group, an aralkyl group, a carbamoyl group, an acyl group, an aryl group or a heterocyclic group, and $J_1$ represents an aromatic group which may be substituted, or a heterocyclic group which may be substituted; and in formula 6, $L_1$ represents an aromatic group which may be substituted, or a heterocyclic group which may be substituted; $M_1$ and $M_2$ each represents =$CR_8$— or —$CR_9$=, or either one of $M_1$ and $M_2$ represents a nitrogen atom and the other represents =$CR_8$— or —$CR_9$=; $R_6$ and $R_7$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; $Q_1$, $R_8$ and $R_9$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an arylsulfinyl group, a heterocyclic sulfinyl group, a sulfamoyl group, a sulfo group or a heterocyclic thio group, and each group may be further substituted; and $R_8$ and $R_6$, or $R_6$ and $R_7$ may combine to form a 5- or 6-membered ring.

2. The coloring composition as claimed in claim 1, wherein $A_3$ in formula 1 represents an aromatic heterocyclic group.

3. The coloring composition as claimed in claim 1, wherein at least one of $A_1$ and $A_2$ in formula 1 represents an aromatic heterocyclic group.

4. The coloring composition as claimed in claim 1, wherein $A_3$ in formula 1 represents an aromatic nitrogen-containing 6-membered heterocyclic group.

5. The coloring composition as claimed in claim 1, wherein the dye represented by formula 1 is a dye represented by the following formula 7:

Formula 7:

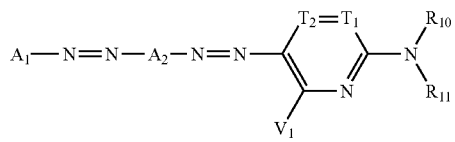

wherein $T_1$ and $T_2$ each represents =$CR_{12}$— or —$CR_{13}$=, or either one of $T_1$ and $T_2$ represents a nitrogen atom and the other represents =$CR_{12}$— or —$CR_{13}$=; $V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted; $R_{10}$ and $R_{11}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_{10}$ and $R_{11}$ do not represent a hydrogen atom at the same time; and $R_{12}$ and $R_{10}$, or $R_{10}$ and $R_{11}$ may combine to form a 5- or 6-membered ring.

6. The coloring composition as claimed in claim 5, wherein the dye represented by formula 7 is a dye represented by the following formula 8 or formula 8-2:

Formula 8:

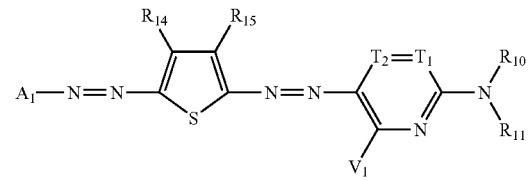

Formula 8-2:

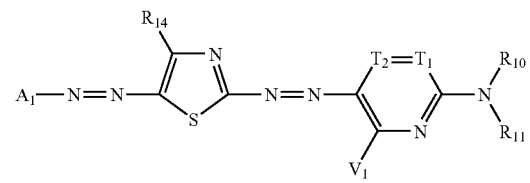

wherein $R_{14}$ and $R_{15}$ each has the same meaning as $R_{12}$ of formula 7 and $A_1$, $R_{10}$, $R_{11}$, $T_1$, $T_2$ and $V_1$ have the same meanings as in formula 7.

7. The coloring composition as claimed in claim 1, wherein the dye represented by formula 2 is a dye represented by the following formula 9:

Formula 9:

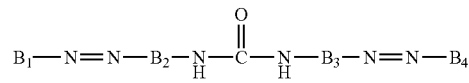

wherein $B_1$, $B_2$, $B_3$ and $B_4$ each independently represents an aromatic group which may be substituted, or a heterocyclic group which may be substituted.

8. The coloring composition as claimed in claim 1, wherein the dye represented by formula 3 is a dye represented by the following formula 10:

Formula 10:

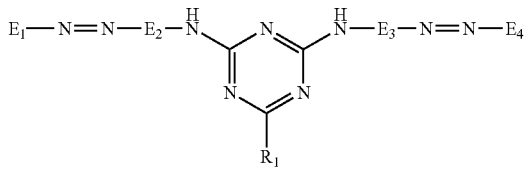

wherein $E_1$, $E_2$, $E_3$ and $E_4$ each independently represents an aromatic group which may be substituted, or a heterocyclic group which may be substituted, and $R_1$ represents a monovalent substituent.

9. The coloring composition as claimed in claim 1, wherein the dye represented by formula 6 is a dye represented by the following formula 11:

Formula 11:

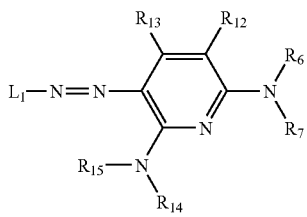

wherein $L_1$, $R_6$ and $R_7$ have the same meanings as in formula 6, $R_{12}$ and $R_{13}$ have the same meanings as $R_8$ and $R_9$, respectively, $R_{14}$ and $R_{15}$ each independently represents a hydrogen atom, an aliphatic group, an aromatic group, a heterocyclic group, an acyl group, an alkoxycarbonyl group, an aryloxycarbonyl group, a carbamoyl group, a sulfonyl group or a sulfamoyl group.

10. The coloring composition as claimed in claim 1, which further comprises a metal phthalocyanine dye.

11. The coloring composition as claimed in claim 10, wherein the metal phthalocyanine dye is a dye represented by the following formula 12:

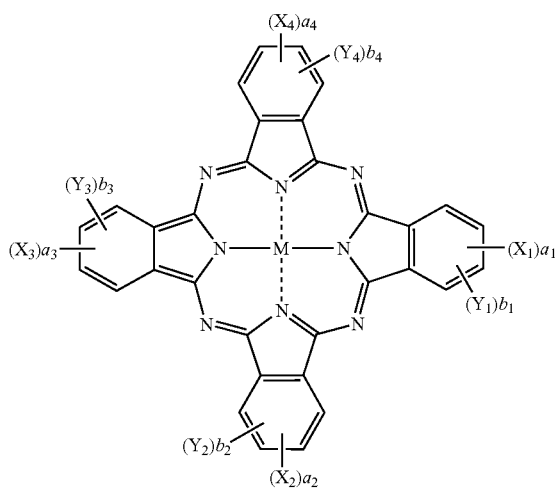

wherein $X_1$, $X_2$, $X_3$ and $X_4$ each independently represents a group selected from the group consisting of —SO-Z, —SO$_2$-Z, —SO$_2$NR$_{18}$R$_{19}$ and a sulfo group, Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, and $R_{18}$ and $R_{19}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, provided that $R_{18}$ and $R_{19}$ do not represent a hydrogen atom at the same time;

$a_1$ to $a_4$ and $b_1$ to $b_4$ represent the number of substituents $X_1$ to $X_4$ and $Y_1$ to $Y_4$, respectively, and each independently represents an integer of 0 to 4, provided that the sum total of $a_1$ to $a_4$ is 2 or more; and $Y_1$, $Y_2$, $Y_3$ and $Y_4$ each independently represents a hydrogen atom or a monovalent substituent.

12. The coloring composition as claimed in claim 11, wherein the dye represented by formula 12 is a dye represented by the following formula 13:

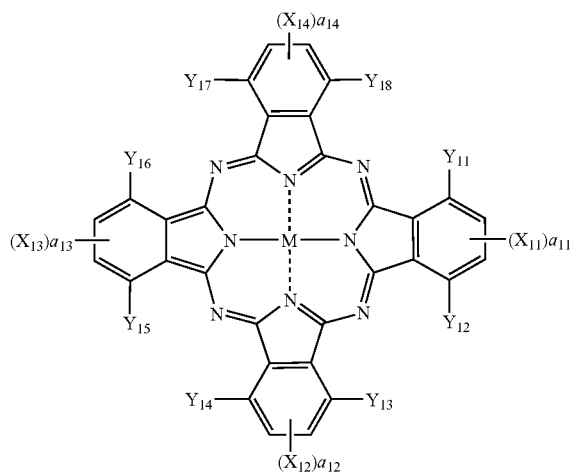

wherein $X_{11}$ to $X_{14}$ and $Y_{11}$ to $Y_{18}$ have the same meanings as $X_1$ $X_4$ and $Y_1$ to $Y_4$ in formula 12, respectively, and $a_{11}$ to $a_{14}$ each independently represents an integer of 1 or 2.

13. An aqueous ink comprising the coloring composition described in claim 1.

14. An inkjet recording ink comprising the aqueous ink described in claim 13.

15. An inkjet recording method comprising forming an image on an image-receiving material by using the inkjet recording ink described in claim 14, the image-receiving material comprising a support and an ink-accepting layer containing an inorganic white pigment particle.

16. The coloring composition according to claim 5, wherein $R_{12}$ or $R_{13}$ each individually represents an alkylamino group, an arylamino group or a heterocyclic amino group.

* * * * *